United States Patent
Damera-Venkata

(10) Patent No.: US 8,468,448 B2
(45) Date of Patent: Jun. 18, 2013

(54) METHODS AND SYSTEMS FOR PREPARING MIXED-CONTENT DOCUMENTS

(75) Inventor: Niranjan Damera-Venkata, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/501,266

(22) PCT Filed: Oct. 28, 2009

(86) PCT No.: PCT/US2009/062288
§ 371 (c)(1),
(2), (4) Date: Apr. 11, 2012

(87) PCT Pub. No.: WO2011/053282
PCT Pub. Date: May 5, 2011

(65) Prior Publication Data
US 2012/0204098 A1  Aug. 9, 2012

(51) Int. Cl.
*G06F 17/21* (2006.01)
(52) U.S. Cl.
USPC .......................................... 715/253
(58) Field of Classification Search
USPC ....................................... 715/253
See application file for complete search history.

(56) References Cited

U.S. PATENT DOCUMENTS

| | | | | |
|---|---|---|---|---|
| 5,956,737 A * | 9/1999 | King et al. | ..................... | 715/202 |
| 6,374,200 B1 * | 4/2002 | Nakagawa | ...................... | 703/8 |
| 6,826,727 B1 * | 11/2004 | Mohr et al. | ..................... | 715/235 |
| 7,039,863 B1 * | 5/2006 | Caro et al. | ..................... | 715/209 |
| 7,330,608 B2 * | 2/2008 | Berkner et al. | ............... | 382/298 |
| 7,434,159 B1 * | 10/2008 | Lin | ................. | 715/243 |
| 2002/0051208 A1 * | 5/2002 | Venable | ..................... | 358/1.18 |
| 2003/0014445 A1 * | 1/2003 | Formanek et al. | ............ | 707/526 |
| 2004/0019851 A1 * | 1/2004 | Purvis et al. | ................. | 715/517 |
| 2004/0025109 A1 * | 2/2004 | Harrington et al. | .......... | 715/500 |
| 2004/0145593 A1 * | 7/2004 | Berkner et al. | ............... | 345/619 |
| 2004/0146199 A1 * | 7/2004 | Berkner et al. | ............... | 382/176 |
| 2004/0194028 A1 * | 9/2004 | O'Brien | ........................ | 715/517 |
| 2005/0055635 A1 | 3/2005 | Bargeron et al. | | |
| 2005/0076290 A1 * | 4/2005 | Balinsky | ....................... | 715/508 |
| 2005/0216832 A1 | 9/2005 | Giannetti | | |
| 2006/0028659 A1 * | 2/2006 | Nishikawa | ..................... | 358/1.2 |
| 2006/0044615 A1 * | 3/2006 | Kobashi et al. | ............. | 358/1.18 |
| 2006/0064630 A1 * | 3/2006 | Balinsky | ....................... | 715/500 |
| 2006/0193008 A1 * | 8/2006 | Osaka et al. | ................. | 358/1.18 |

(Continued)

OTHER PUBLICATIONS

Harrington et al., Asthetic Measures for Automated Document Layout, ACM, DocEng'04, Oct. 28-30, 2004, p. 109-111.*

(Continued)

*Primary Examiner* — Frank D Mills

(57) ABSTRACT

Embodiments of the present invention are directed to automated methods and systems for generating mixed-content documents. In one embodiment, an automated method for generating a document layout includes receiving raw text, figures, references, and semantic information as input (901), and determining an allocation (1003) of text, figures, and references for each page of a document. The method also includes, for each page of the document, determining a template (1005) for displaying the allocation assigned to the page, and scaling template fields to exhibit the text, figures, and references assigned to the page. The method then renders (1007) the document with text, figures, and references allocated to each page within appropriate scaled template fields of the template selected for each page.

9 Claims, 11 Drawing Sheets

U.S. PATENT DOCUMENTS

| | | | |
|---|---|---|---|
| 2007/0079236 A1* | 4/2007 | Schrier et al. | 715/517 |
| 2007/0100874 A1* | 5/2007 | Balinsky et al. | 707/102 |
| 2007/0118797 A1* | 5/2007 | Layzell | 715/517 |
| 2007/0180363 A1* | 8/2007 | Dance | 715/517 |
| 2007/0192687 A1* | 8/2007 | Simard et al. | 715/523 |
| 2007/0204220 A1* | 8/2007 | Petrov Nickolov et al. | 715/530 |
| 2007/0208996 A1* | 9/2007 | Berkner et al. | 715/521 |
| 2009/0254814 A1 | 10/2009 | Lai et al. | |
| 2010/0017704 A1* | 1/2010 | Jaffe et al. | 715/243 |
| 2012/0204100 A1* | 8/2012 | Damera-Venkata | 715/244 |

OTHER PUBLICATIONS

Bateman et al., Towards Constructive Text, Diagram, and Layout Generation for Information Preservation, ACM, Computational Lingustics vol. 27 No. 3, 2001, p. 409-449.* de Oliveira, Two Algorithims for Automatic Document Page Layout, ACM, DocEng'08, Sep. 16-19, 2008, p. 141-149.*

Jacobs et al., Adaptive Grid-Based Document Layout, ACM, Sig-Graph'03, 2003, p. 838-847.*

* cited by examiner

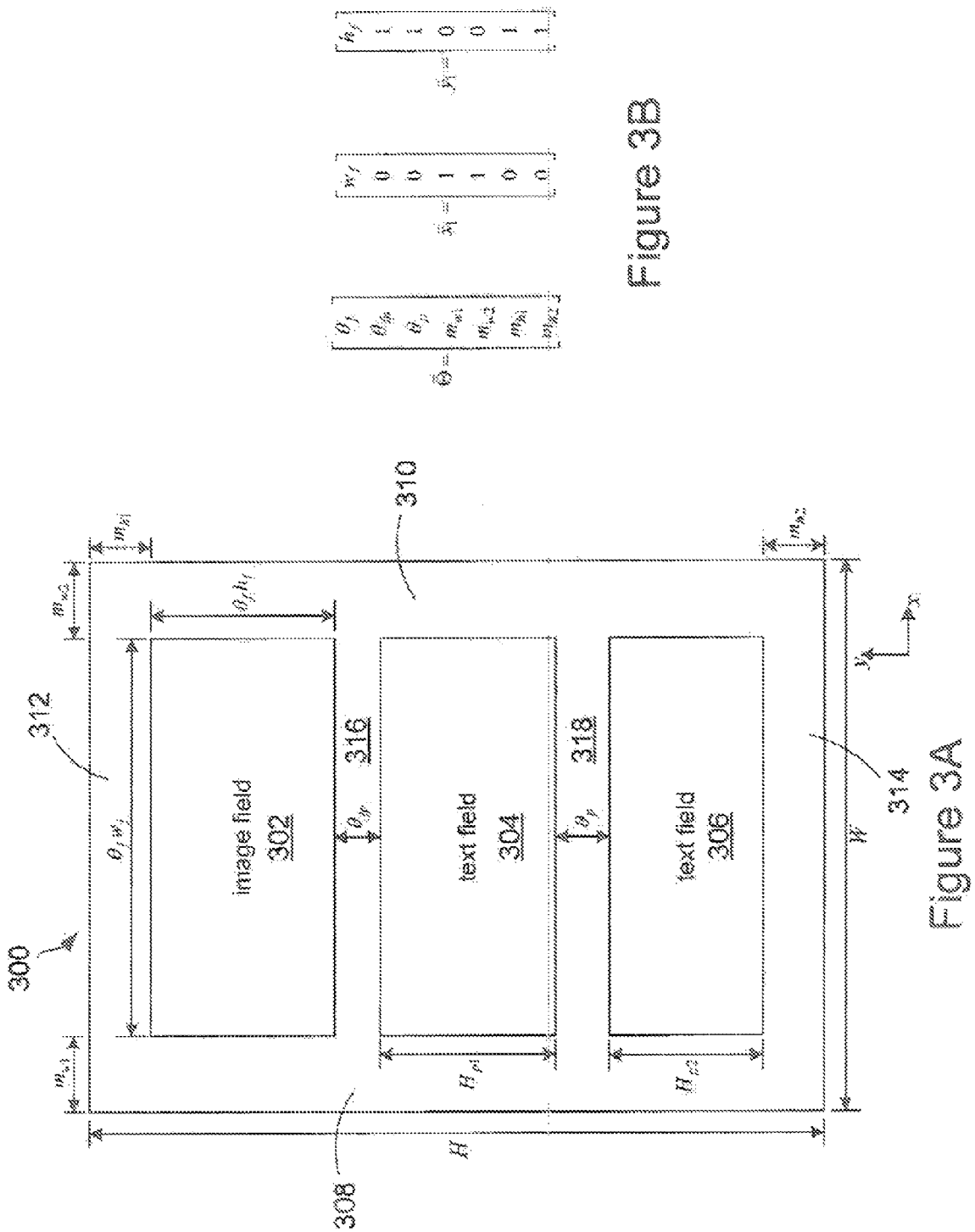

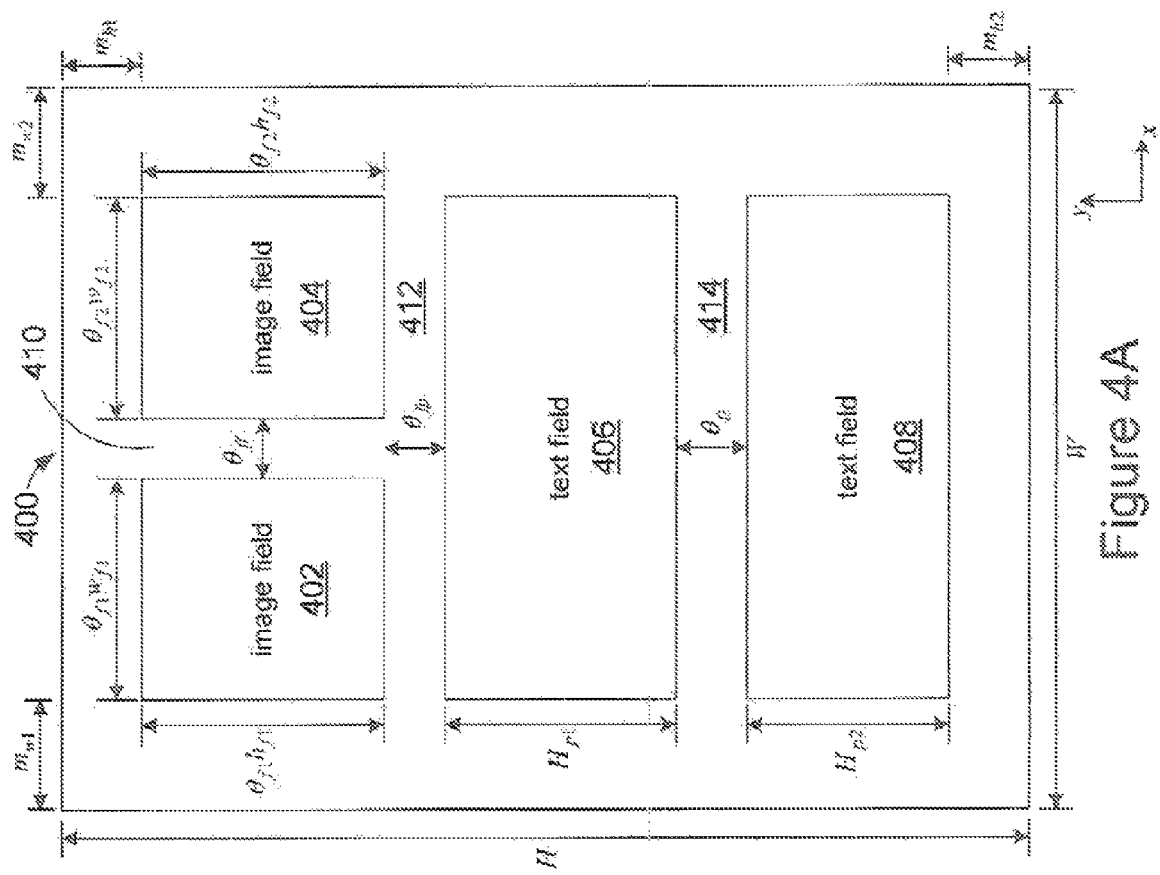

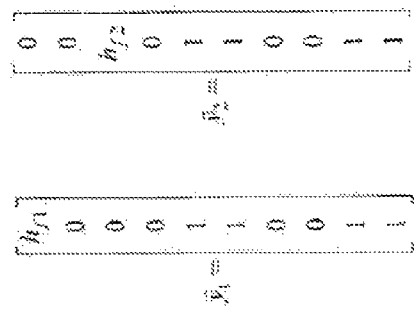
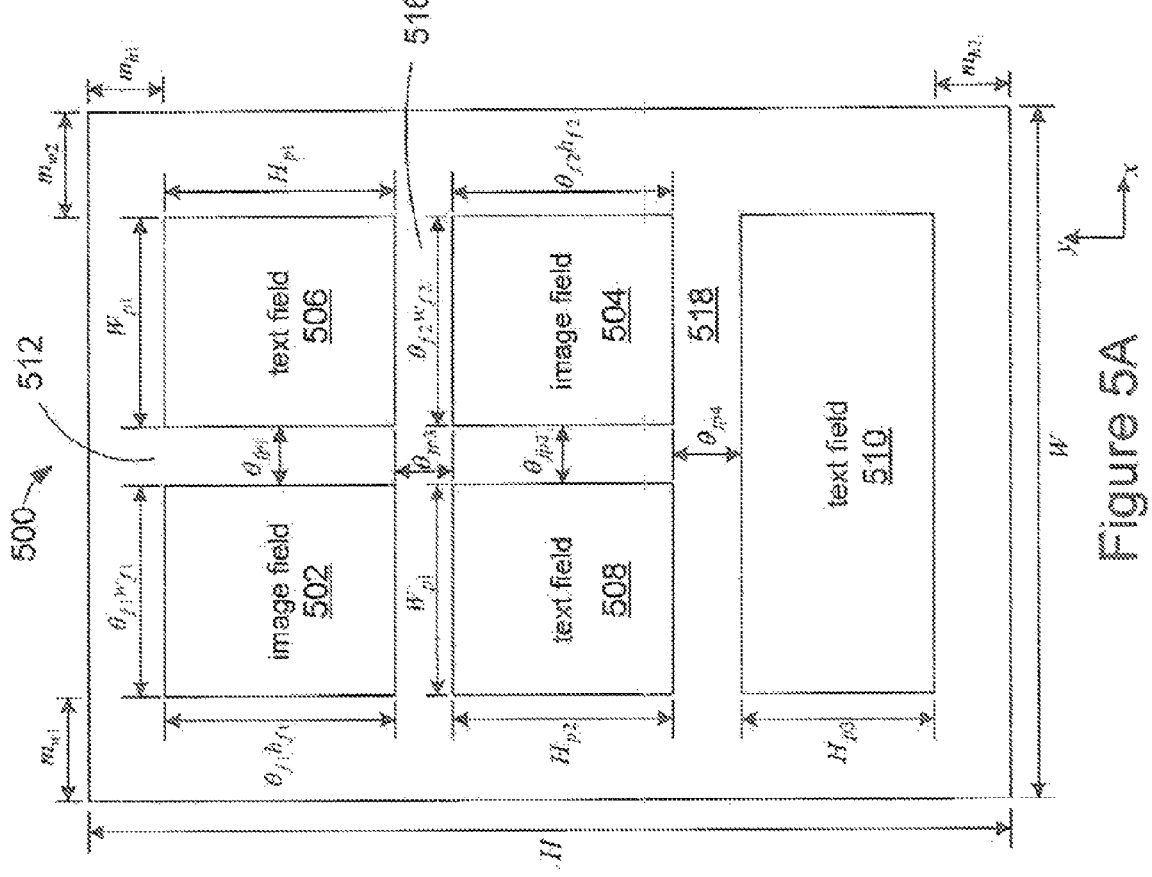
Figure 5A
Figure 5B

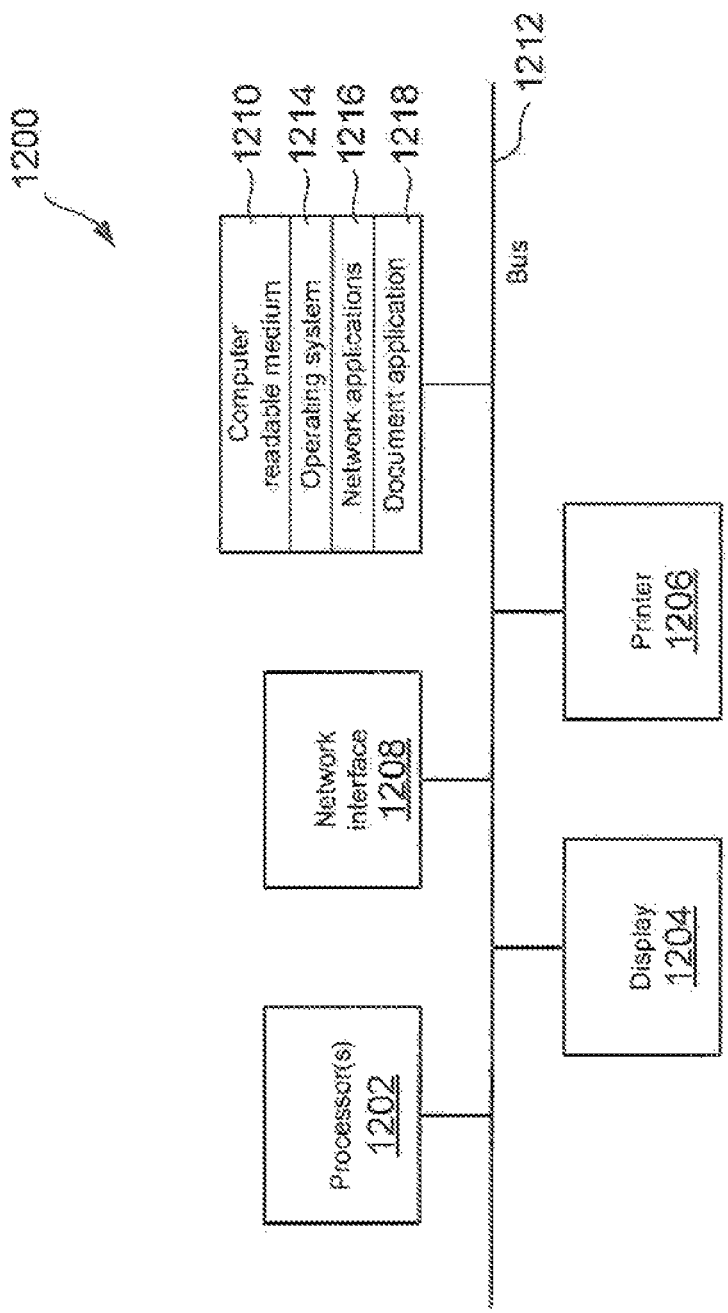

METHODS AND SYSTEMS FOR PREPARING MIXED-CONTENT DOCUMENTS

TECHNICAL FIELD

Embodiments of the present invention relate to document layout, and in particular, to automated methods and system for determining a document layout.

BACKGROUND

A mixed-content document can be organized to display a combination of text, images, headers, sidebars, or any other elements that are typically dimensioned and arranged to display information to a reader in a coherent, informative, and visually aesthetic manner. Mixed-content documents can be in printed or electronic form. Examples of mixed-content documents include articles, flyers, business cards, newsletters, website displays, brochures, single or multi page advertisements, envelopes, and magazine covers just to name a few. In order to design a layout for a mixed-content document, a document designer selects for each page of the document a number of elements, element dimensions, spacing between elements called "white space," font size and style for text, background, colors, and an arrangement of the elements.

In recent years, advances in computing devices have accelerated the growth and development of software-based document layout design tools and, as a result, increased the efficiency with which mixed-content documents can be produced. A first type of design tool uses a set of gridlines that can be seen in the document design process but are invisible to the document reader. The gridlines are used to align elements on a page, allow for flexibility by enabling a designer to position elements within a document, and even allow a designer to extend portions of elements outside of the guidelines, depending on how much variation the designer would like to incorporate into the document layout. A second type of document layout design tool is a template. Typical design tools present a document designer with a variety of different templates to choose from for each page of the document. FIG. 1 shows an example of a template 100 for a single page of a mixed-content document. The template 100 includes two image fields 101 and 102, three text fields 104-106, and a header field 108. The text, image, and header fields are separated by white spaces. A white space is a blank region of a template separating two fields, such as white space 110 separating image field 101 from text field 105. A designer can select the template 100 from a set of other templates, input image data to fill the image fields 101 and text data to fill the text fields 104-106 and the header 108.

However, many steps in organizing and determining an overall layout of an entire document continue to require numerous tasks that have to be completed by the document designer. For example, it is often the case that the dimensions of template fields are fixed, making it difficult for document designers to resize images and arrange text to fill particular fields creating image and text overflows, cropping, or other unpleasant scaling issues. FIG. 2 shows the template 100 where two images, represented by dashed-line boxes 201 and 202, are selected for display in the image fields 101 and 102. As shown in the example of FIG. 2, the images 201 and 202 do not fit appropriately within the boundaries of the image fields 101 and 102. With regard to the image 201, a design tool may be configured to crop the image 201 to fit within the boundaries of the image field 101 by discarding peripheral, but visually import, portions of the image 201, or the design tool may attempt to fit the image 201 within the image field 101 by rescaling the aspect ratio of the image 201, resulting in a visually displeasing distorted image 201. Because image 202 fits within the boundaries of image field 102 with room to spare, white spaces 204 and 206 separating the image 202 from the text fields 104 and 106 exceed the size of the white spaces separating other elements in the template 100 resulting in a visually distracting uneven distribution of the elements. The design tool may attempt to correct for this problem by rescaling the aspect ratio of the image 202 to fit within the boundaries of the image field 102, also resulting in a visually displeasing distorted image 202.

Document designers and users of document-layout software continue to seek enhancements in document layout design methods and systems.

BRIEF DESCRIPTION OF THE DRAWINGS

FIG. 3A shows an exemplary representation of a first single page template with dimensions identified in accordance with embodiments of the present invention.

FIG. 3B shows vector characterization of template parameters and dimensions of an image and white spaces associated with the template shown in FIG. 3A in accordance with embodiments of the present invention.

FIG. 4A shows an exemplary representation of a second single page template with dimensions identified in accordance with embodiments of the present invention.

FIG. 4B shows vector characterization of template parameters and dimensions of images and white spaces associated with the template shown in FIG. 4A in accordance with embodiments of the present invention.

FIG. 5A shows an exemplary representation of a third single page template with dimensions identified in accordance with embodiments of the present invention.

FIG. 5B shows vector characterization of template parameters and dimensions of images and white spaces associated with the template shown in FIG. 5A in accordance with embodiments of the present invention.

FIG. 12 shows a schematic representation of a computing device configured in accordance with embodiments of the present invention.

DETAILED DESCRIPTION

Figure 2:
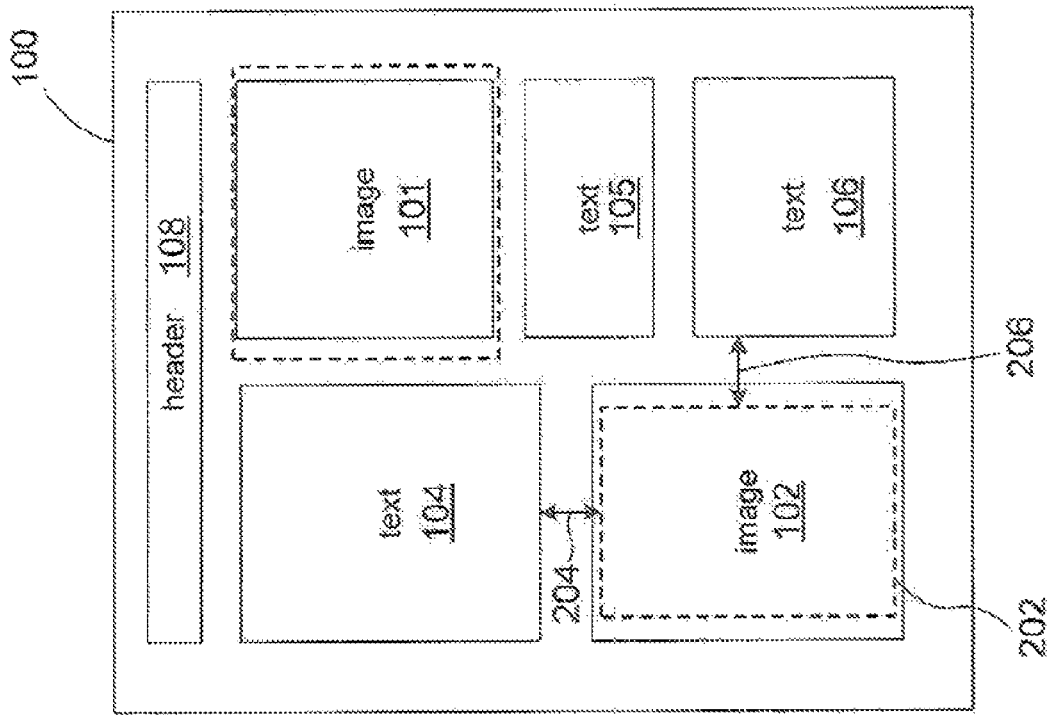
FIG. 2 shows the template shown in FIG. 1 with two images selected for display in the image fields.

Embodiments of the present invention are directed to automated methods and systems for generating mixed-content documents. Methods and systems include automatically allocating text and images per page, automatically selecting templates for each page, and automatically scaling images, setting page design elements, and dimensioning whitespaces. These methods and systems are based on maximizing a joint probability distribution that characterizes optimal text and figure allocations per page, optimal template selection per page, and optimal template element dimensions and spacing per page.

Embodiments of the present invention are mathematical in nature and, for this reason, are described below with reference to numerous equations and graphical illustrations. In particular, embodiments of the present invention are based on Bayesian networks and Bayes' Theorem from the probability theory branch of mathematics. Although mathematical expressions alone may be sufficient to fully describe and characterize embodiments of the present invention to those skilled in the art, the more graphical, problem oriented examples, and control-flow-diagram approaches included in the following discussion are intended to illustrate embodiments of the present invention so that the present invention may be accessible to readers with various backgrounds. In order to assist in understanding descriptions of various embodiments of the present invention, an overview of Bayes' Theorem is provided in a first subsection, template parameters are introduced in a second subsection, probabilistic methods for optimizing document layout is presented in a third subsection, and an implementation is presented in a fourth subsection.

An Overview of Bayes' Theorem and Notation from Probability Theory

Readers already familiar with Bayes' Theorem and other related concepts from probability theory can skip this subsection and proceed to the next subsection titled Template Parameters. This subsection is intended to provide readers who are unfamiliar with Bayes' Theorem a basis for understanding relevant terminology, notation, and provide a basis for understanding how Bayes' Theorem is used to determine document template parameters as described below. For the sake of simplicity, Bayes' theorem and related topics are described below with reference to sample spaces with discrete events, but one skilled in the art will recognize that these concepts can be extended to sample spaces with continuous distributions of events.

A description of probability begins with a sample space S, which is the mathematical counterpart of an experiment and mathematically serves as a universal set for all possible outcomes of an experiment. For example, a discrete sample space can be composed of all the possible outcomes of tossing a fair coin two times and is represented by:

$$S = \{HH, HT, TH, TT\}$$

where H represents the outcome heads, and T represents the outcome tails. An event is a set of outcomes, or a subset of a sample space, to which a probability is assigned. A simple event is a single element of the sample space S, such as the event "both coins are tails" TT, or an event can be a larger subset of S, such as the event "at least one coin toss is tails" comprising the three simple events HT, TH, and TT.

The probability of an event E, denoted by P(E), satisfies the condition $0 \leq P(E) \leq 1$ and is the sum of the probabilities associated with the simple events comprising the event E. For example, the probability of observing each of the simple events of the set S, representing the outcomes of tossing a fair coin two times, is ¼. The probability of the event "at least one coin is heads" is ¾ (i.e., ¼+¼+¼, which are the probabilities of the simple events HH, HT, and TH, respectively).

Bayes' Theorem provides a formula for calculating conditional probabilities. A conditional probability is the probability of the occurance of some event A, based on the occurrence of a different event B. Conditional probability can be defined by the following equation:

$$P(A \mid B) = \frac{P(A \cap B)}{P(B)}$$

where P(A|B) is read as "the probability of the event A, given the occurance of the event B,"

P(A∩B) is read as "the probability of the events A and B both occurring," and

P(B) is simple the probability of the event B occurring regardless of whether or not the event A occurs.

For an example of conditional probabilities, consider a club with four male and five female charter members that elects two women and three men to membership. From the total of 14 members, one person is selected at random, and suppose it is known that the person selected is a charter member. Now consider the question of what is the probability the person selected is male? In other words, given that we already know the person selected is a charter member, what is the probability the person selected at random is male? In terms of the conditional probability, B is the event "the person selected is a charter member," and A is the event "the person selected is male." According to the formula for conditional probability:

$$P(B) = 9/14, \text{ and}$$

$$P(A \cap B) = 7/14$$

Thus, the probability of the person selected at random is male given that the person selected is a charter member is:

$$P(A \mid B) = \frac{P(A \cap B)}{P(B)} = \frac{7/14}{9/14} = \frac{7}{9}$$

Bayes' theorem relates the conditional probability of the event A given the event B to the probability of the event B given the event A. In other words, Bayes' theorem relates the conditional probabilities P(A|B) and P(B|A) in a single mathematical expression as follows:

$$P(A \mid B) = \frac{P(B \mid A)P(A)}{P(B)}$$

P(A) is a prior probability of the event A. It is called the "prior" because it does not take into account the occurance of the event B. P(B|A) is the conditional probability of observing the event B given the observation of the event A. P(A|B) is the conditional probability of observing the event A given the observation of the event B. It is called the "posterior" because it depends from, or is observed after, the occurance of the event B. P(B) is a prior probability of the event B, and can serve as a normalizing constant.

For an exemplary application of Bayes' theorem consider two urns containing colored balls as specified in Table I:

TABLE I

| Urn | Red | Yellow | Blue |
|-----|-----|--------|------|
| 1   | 3   | 4      | 2    |
| 2   | 1   | 2      | 3    |

Suppose one of the urns is selected at random and a blue ball is removed. Bayes' theorem can be used to determine the probability the ball came from urn 1. Let B denote the event "ball selected is blue." To account for the occurrence of B there are two hypotheses: $A_1$ is the event urn 1 is selected, and $A_2$ is the event urn 2 is selected. Because the urn is selected at random, $$P(A_1)=P(A_2)=1/2$$

Based on the entries in Table I, conditional probabilities also give:

$$P(B|A_1)=2/9, \text{ and}$$

$$P(B|A_2)=3/6$$

The probability of the event "ball selected is blue," regardless of which urn is selected, is $$P(B) = P(B|A_1)P(A_1) + P(B|A_2)P(A_2)$$
$$= (2/9)(1/2) + (3/6)(1/2) = 13/27$$

Thus, according to Bayes' theorem, the probability the blue ball came from urn 1 is given by:

$$P(A_i|B) = \frac{P(B|A_1)P(A_1)}{P(B)} = \frac{(2/9)(1/2)}{13/27} = \frac{3}{13}$$

Template Parameters

In this subsection, template parameters used to obtain dimensions of image fields and white spaces of a document template are described with reference to just three exemplary document templates. The three examples described below are not intended to be exhaustive of the nearly limitless possible dimensions and arrangements of template elements. Instead, the examples described in this subsection are intended to merely provide a basic understanding of how the dimensions of elements of a template can be characterized in accordance with embodiments of the present invention, and are intended to introduce the reader to the terminology and notation used to represent template parameters and dimensions of document templates. Note that template parameters are not used to change the dimensions of the text fields or the overall dimensions of the templates. Template parameters are formally determined using probabilistic methods and systems described below in the subsequent subsection.

Document templates represent the arrangement elements for displaying text and images for each page of the document. FIG. 3A shows an exemplary representation of a first single page template 300 with dimensions identified in accordance with embodiments of the present invention. Template 300 includes an image field 302, a first text field 304, and a second text field 306. The width and height of the template 300 are fixed values represented by constants W and H, respectively. Widths of margins 308 and 310, $m_{w1}$ and $m_{w2}$, extending in the y-direction are variable, and widths of top and bottom margins 312 and 314, $m_{h1}$ and $m_{h2}$, extending in the x-direction are variable. Note that templates may include a constraint on the minimum margin width below which the margins cannot be reduced. The dimensions of text fields 304 and 306 are also fixed with the heights denoted by $H_{p1}$ and $H_{p2}$, respectively. As shown in the example of FIG. 3A, the scaled height and width dimensions of an image placed in the image field 302 are represented by $\theta_f h_f$ and $\theta_f w_f$, respectively, where $h_f$ and $w_f$ represent the height and width of the image, and $\theta_f$ is a single template parameter used to scale both the height $h_f$ and width $w_f$ of the image. Note that using a single scale factor $\theta_f$ to adjust both the height and width of an image reduces image distortion, which is normally associated with adjusting the aspect ratio of an image in order to fit the image within an image field. FIG. 3A also includes a template parameter $\theta_{fp}$ that scales the width of the white space 316, and a template parameter $\theta_p$ that scales the width of the white space 318.

The template parameters and dimensions of an image and white space associated with the template 300 can be characterized by vectors shown in FIG. 3B in accordance with embodiments of the present invention. The parameter vector $\overline{\Theta}$ includes three template parameters $\theta_f$, $\theta_{fp}$, and $\theta_p$, associated with adjusting the dimensions of the image field 302 and the white spaces 316 and 318 and includes the variable margin values $m_{w1}$, $m_{w2}$, $m_{h1}$, and $m_{h2}$. Vector elements of vector $\overline{x}_1$ represent dimensions of the image displayed in the image field 302 and margins in the x-direction, and vector elements of vector $\overline{y}_1$ represent dimensions of the image, white spaces, and margins in the y-direction. The vector elements of the vectors $\overline{x}_1$ and $\overline{y}_1$ are selected to correspond to the template parameters of the parameter vector $\overline{\Theta}$ as follows. Because both the width $w_f$ and the height $h_f$ of the image are scaled by the same parameter $\theta_f$, as described above, the first vector elements of $\overline{x}_1$ and $\overline{y}_1$ are $w_f$ and $h_f$, respectively. The only other dimensions varied in the template 300 are the widths of the white spaces 316 and 318, which are varied in the y-direction, and the margins which are varied in the x- and y-directions. For $\overline{x}_1$, the two vector elements corresponding to the parameters $\theta_{fp}$ and $\theta_p$ are "0," the two vector elements corresponding to the margins $m_{w1}$ and $m_{w2}$ are "1," and the two vector elements corresponding to the margins $m_{h1}$ and $m_{h2}$ are "0." For $\overline{y}_1$, the two vector elements corresponding to the parameters $\theta_{fp}$ and $\theta_p$ are "1," the two vector elements corresponding to the margins $m_{w1}$ and $m_{w2}$ are "0," and the two vector elements corresponding to the margins $m_{h1}$ and $m_{h2}$ are "1."

The vector elements of $\overline{x}_1$ and $\overline{y}_1$ are arranged to correspond to the parameters of the vector $\overline{\Theta}$ in order to satisfy the following condition in the x-direction:

$$\overline{\Theta}^T \overline{x}_1 - W_1 \approx 0$$

and the following condition in the y-direction:

$$\overline{\Theta}^T \overline{y}_1 - H_1 \approx 0$$

where
$\overline{\Theta}^T \overline{x}_1 = \theta_f w_f + m_{w1} + m_{w2}$ is the scaled width of the image displayed in the image field 302;

$W_1 = W$ is a variable corresponding to the space available to the image displayed in the image field 302 in the x-direction;

$\overline{\Theta}^T \overline{y}_1 = \theta_f h_f + \theta_{fp} + \theta_p + m_{h1} + m_{h2}$ is the sum of the scaled height of the image displayed in the image field 302 and the parameters associated with scaling the white spaces 316 and 318; and $H_1 = H - H_{p1} - H_{p2}$ is a variable corresponding to the space available for the image displayed in the image field 302 and the widths of the white spaces 316 and 318 in the y-direction.

Probabilistic methods based on Bayes' theorem described below can be used to determine the template parameters so that the conditions $\overline{\Theta}^T\overline{x}_1 - W_1 \approx 0$ and $\overline{\Theta}^T\overline{y}_1 - H_1 \approx 0$ are satisfied.

FIG. 4A shows an exemplary representation of a second single page template 400 with dimensions identified in accordance with embodiments of the present invention. Template 400 includes a first image field 402, a second image field 404, a first text field 406, and a second text field 408. Like the template 300 described above, the template 400 width W and height H are fixed and side margins $m_{w1}$ and $m_{w2}$ extending in the y-direction and top and bottom margins $m_{h1}$ and $m_{h2}$ extending in the x-direction are variable but are subject to minimum value constraints. The dimensions of text fields 404 and 406 are also fixed with the heights denoted by $H_{p1}$ and $H_{p2}$, respectively. As shown in the example of FIG. 4A, the scaled height and width dimensions of an image placed in the image field 402 are represented by $\theta_{f1}h_{f1}$ and $\theta_{f1}w_{f1}$, respectively, where $h_{f1}$ and $w_{f1}$ represent the height and width of the image, and $\theta_{f1}$ is a single template parameter used to scale both the height $h_{f1}$ and width $w_{f1}$ of the image. The scaled height and width dimensions of an image displayed in the image field 404 are represented by $\theta_{f2}h_{f2}$ and $\theta_{f2}w_{f2}$, respectively, where $h_{f2}$ and $w_{f2}$ represent the height and width of the image, and $\theta_{f2}$ is a single template parameter used to scale both the height $h_{f2}$ and width $w_{f2}$ of the image. FIG. 4A also includes a template parameter that scales the width of the white space 410, a template parameter $\theta_{fp}$ that scales the width of the white space 412, and a template parameter $\theta_p$ that scales the width of the white space 414.

The template parameters and dimensions of images and white spaces associated with the template 400 are characterized by vectors shown in FIG. 4B in accordance with embodiments of the present invention. The parameter vector $\overline{\Theta}$ includes the five template parameters $\theta_{f1}$, $\theta_{f2}$, $\theta_{fp}$, and $\theta_p$ and the variable margin values $m_{w1}$, $m_{w2}$, $m_{h1}$, and $m_{h2}$. The changes to the template 400 in the x-direction are the widths of the images displayed in the image fields 402 and 404 and the width of the white space 410, which are characterized by a single vector $\overline{x}_1$. As shown in FIG. 4B, the first two vector elements of $\overline{x}_1$ are the widths $w_{f1}$ and $w_{f2}$ of the images displayed in the image fields 402 and 404 in the x-direction and correspond to the first two vector elements of the parameter vector $\overline{\Theta}$. The third vector element of $\overline{x}_1$ is "1" which accounts for the width of the white space 410 and corresponds to the third vector element of the parameter vector $\overline{\Theta}$. The fourth and fifth vector elements of $\overline{x}_1$ are "0," which correspond to the fourth and fifth the vector elements of $\overline{\Theta}$. The remaining four vector elements of $\overline{x}_1$ corresponding to the margins $m_{w1}$ and $m_{w2}$ are "1" and corresponding to the margins $m_{h1}$ and $m_{h2}$ are "0."

On the other hand, changes to the template 400 in the y-direction are characterized by two vectors $\overline{y}_1$ and $\overline{y}_2$, each vector accounting for changes in the height of two different images displayed in the image fields 402 and 404 and the white spaces 412 and 414. As shown in FIG. 4B, the first vector element of $\overline{y}_1$ is the height of the image displayed in the image field 402 and corresponds to the first vector element of the parameter vector $\overline{\Theta}$. The second vector element of $\overline{y}_2$ is the height of the image displayed in the image field 404 and corresponds to the second term of the parameter vector $\overline{\Theta}$. The fourth and fifth vector elements of $\overline{y}_1$ and $\overline{y}_2$ are "1" which account for the widths of the white spaces 412 and 414 and correspond to the fourth and fifth vector elements of the parameter vector $\overline{\Theta}$. The "0" vector elements of $\overline{y}_1$ and $\overline{y}_2$ correspond to the parameters that scale dimensions in the x-direction. The remaining four vector elements of $\overline{y}_1$ and $\overline{y}_2$ corresponding to the margins $m_{w1}$ and $m_{w2}$ are "0" and corresponding to the margins $m_{h1}$ and $m_{h2}$ are "1."

As described above with reference to FIG. 4B, the vector elements of $\overline{x}_1$, $\overline{y}_1$ and $\overline{y}_2$ are arranged to correspond to the parameters of the vector $\overline{\Theta}$ to satisfy the following condition in the x-direction:

$$\overline{\Theta}^T\overline{x}_1 - W_1 \approx 0$$

and the following conditions in the y-direction:

$$\overline{\Theta}^T\overline{y}_1 - H_1 \approx 0$$

$$\overline{\Theta}^T\overline{y}_2 - H_2 \approx 0$$

where
$\overline{\Theta}^T\overline{x}_1 = \theta_{f1}w_{f1} + \theta_{f2}w_{f2} + \theta_{fp} + m_{w1} + m_{w2}$ is the scaled width of the images displayed in the image fields 402 and 404 and the width of the white space 410;

$W_1 = W$ is a variable corresponding to the space available for the images displayed in the image fields 402 and 404 and the white space 410 in the x-direction;

$\overline{\Theta}^T\overline{y}_1 = \theta_{f1} = \theta_{f1} + \theta_{fp} + \theta_p + m_{h1} + m_{h2}$ is the sum of the scaled height of the image displayed in the image field 402 and the parameters associated with scaling the white spaces 412 and 414;

$\overline{\Theta}^T\overline{y}_2 = \theta_{f2}h_{f2} + \theta_{fp} + \theta_p + m_{h1} + m_{h2}$ is the sum of the scaled height of the image displayed in the image field 404 and the parameters associated with scaling the white spaces 412 and 414, $H_1 = H - H_{p1} - H_{p2}$ is a first variable corresponding to the space available for the image displayed in the image field 402 and the widths of the white spaces 412 and 414 in the y-direction; and $H_2 = H_1$ is a second variable corresponding to the space available for the image displayed in the image field 404 and the widths of the white spaces 412 and 414 in the y-direction.

Probabilistic methods based on Bayes' theorem described below can be used to determine the template parameters so that the conditions $\overline{\Theta}^T\overline{x}_1 - W_1 \approx 0$, $\overline{\Theta}^T\overline{y}_1 - H_1 \approx 0$ and $\overline{\Theta}^T\overline{y}_2 - H_2 \approx 0$ are satisfied.

FIG. 5A shows an exemplary representation of a single page template 500 with dimensions identified in accordance with embodiments of the present invention. Template 500 includes a first image field 502, a second image field 504, a first text field 506, a second text field 508, and a third text field 510. Like the templates 300 and 400 described above, the template width W and height H are fixed and side margins $m_{w1}$ and $m_{w2}$ extending in the y-direction and top and bottom margins $m_{h1}$ and $m_{h2}$ extending in the x-direction are variable, but are subject to minimum value constraints. The dimensions of text fields 506, 508, and 510 are also fixed with the heights denoted by $H_{p1}$, $H_{p2}$, and $H_{p3}$, respectively, and the widths of the text fields 506 and 508 denoted by $W_{p1}$ and $W_{p2}$, respectively. As shown in the example of FIG. 5A, the scaled height and width dimensions of an image displayed in the image field 502 are represented by $\theta_{f1}h_{f1}$ and $\theta_{f1}w_{f1}$, respectively, where $h_{f1}$ and $w_{f1}$ represent the height and width of the image, and $\theta_{f1}$ is a single template parameter used to scale both the height $h_{f1}$ and width $w_{f1}$ of the image. The scaled height and width dimensions of an image displayed in the image field 504 are represented by $\theta_{f2}h_{f2}$ and $\theta_{f2}w_{f2}$, respectively, where $h_{f2}$ and $w_{f2}$ represent the height and width of the image, and $\theta_{f2}$ is a single template parameter used to scale both the height $h_{f2}$ and width $w_{f2}$ of the image. FIG. 5A also includes a template parameter $\theta_{fp1}$ that scales the width of the white space 512, a template parameter $\theta_{fp2}$ that scales the width of the white space 514, a template parameter $\theta_{fp3}$ that scales the width of the white space 516, and a template parameter $\theta_{fp4}$ that scales the width of white space 518.

The template parameters and dimensions of images and white spaces associated with the template 500 are characterized by vectors shown in FIG. 5B in accordance with embodiments of the present invention. The parameter vector $\overline{\Theta}$ includes the six template parameters $\theta_{f1}, \theta_{fp1} \theta_{f2}, \theta_{fp2} \theta_{fp3}$, and $\theta_{fp4}$ and the variable margin values $m_{w1}, m_{w2}, m_{h1}$, and $m_{h2}$. The changes to the template 500 in the x-direction include the width of the image displayed in the image field 502 and the width of the white space 512, and separate changes in the width of the image displayed in the image field 504 and the width of the white space 514. These changes are characterized by vectors $\overline{x}_1$ and $\overline{x}_2$. As shown in FIG. 5B, the first vector element of $\overline{x}_1$ is the width $w_{f1}$ and the second vector element is "1" which correspond to first two vector elements of the parameter vector $\overline{\Theta}$. The third vector element of $\overline{x}_2$ is the width $w_{f2}$ and the fourth vector element is "1" which correspond to first third and fourth vector elements of the parameter vector $\overline{\Theta}$. The fifth and sixth vector elements of $\overline{x}_1$ and $\overline{x}_2$ corresponding to white spaces that scale dimensions in the y-direction are "0." The remaining four vector elements of $\overline{x}_1$ and $\overline{x}_2$ corresponding to the margins $m_{w1}$ and $m_{w2}$ are "1" and corresponding to the margins $m_{h1}$ and $m_{h2}$ are "0."

On the other hand, changes to the template 500 in the y-direction are also characterized by two vectors $\overline{y}_1$ and $\overline{y}_2$. As shown in FIG. 5B, the first vector element of $\overline{y}_1$ is the height of the image displayed in the image field 502 and corresponds to the first vector element of the parameter vector $\overline{\Theta}$. The third vector element of $\overline{y}_2$ is the height of the image displayed in the image field 504 and corresponds to the third term of the parameter vector $\overline{\Theta}$. The fifth and sixth vector elements of $\overline{y}_1$ and $\overline{y}_2$ are "1" which account for the widths of the white spaces 516 and 518 and correspond to the fifth and sixth vector elements of the parameter vector $\overline{\Theta}$. The vector elements of $\overline{y}_1$ and $\overline{y}_2$ corresponding to white space that scale in the x-direction are "0." The remaining four vector elements of $\overline{y}_1$ and $\overline{y}_2$ corresponding to the margins $m_{w1}$ and $m_{w2}$ are "0" and corresponding to the margins $m_{h1}$ and $m_{h2}$ are "1."

As described above with reference to FIG. 5B, the vector elements of $\overline{x}_1, \overline{x}_2, \overline{y}_1$, and $\overline{y}_2$ are arranged to correspond to the parameters of the vector $\overline{\Theta}$ in order to satisfy the following conditions in the x-direction:

$$\overline{\Theta}^T \overline{x}_1 - W_1 \approx 0$$

$$\overline{\Theta}^T \overline{x}_2 - W_2 \approx 0$$

and satisfy the following conditions in the y-direction:

$$\overline{\Theta}^T \overline{y}_1 - H_1 \approx 0$$

$$\overline{\Theta}^T \overline{y}_2 - H_2 \approx 0$$

where $\overline{\Theta}^T \overline{x}_1 = \theta_{f1} w_{f1} + \theta_{fp1} + m_{w1} + m_{w2}$ is the scaled width of the images displayed in the image fields 502 and the width of the white space 512;

$W_1 = W - W_{p1}$ is a first variable corresponding to the space available for displaying an image into the image field 502 and the width of the white space 512 in the x-direction;

$\overline{\Theta}^T \overline{x}_2 = \theta_{f2} w_{f2} + \theta_{fp2} + m_{h1} + m_{h2}$ is the scaled width of the image displayed in the image field 504 and the width of the white space 514;

$W_2 = W - W_{p2}$ is a second variable corresponding to the space available for displaying an image into the image field 504 and width of the white space 514 in the x-direction;

$\overline{\Theta}^T \overline{y}_1 = \theta_{f1} h_{f1} + \theta_{fp3} + \theta_{fp4} + m_{h1} + m_{h2}$ is the sum of the scaled height of the image displayed in the image field 402 and the parameters associated with scaling the white spaces 412 and 414;

$H_1 = H - H_{p2} - H_{p3}$ is a first variable corresponding to the space available to the height of the image displayed in image field 502 and the widths of the white spaces 516 and 518 in the y-direction;

$\overline{\Theta}^T \overline{y}_2 = \theta_{f2} h_{f2} + \theta_{fp3} + \theta_{fp4} + m_{h1} + m_{h2}$ is the sum of the scaled height of the image displayed in the image field 404 and the parameters associated with scaling the white spaces 412 and 414; and $H_2 = H - H_{p1} - H_{p3}$ is a second variable corresponding to the space available to the height of the image displayed in image field 504 and the widths of the white spaces 516 and 518 in the y-direction.

Probabilistic methods based on Bayes' theorem described below can be used to determine the template parameters so that the conditions $\overline{\Theta}^T \overline{x}_1 - W_1 \approx 0$, $\overline{\Theta}^T \overline{x}_2 - W_2 \approx 0$, $\overline{\Theta}^T \overline{y}_1 - H_1 \approx 0$, and $\overline{\Theta}^T \overline{y}_2 - H_2 \approx 0$ are satisfied.

Note that the templates 300, 400, and 500 are examples representing how the number of constants associated with the space available in the x-direction $W_i$ and corresponding vectors $\overline{x}_i$, and the number of constants associated with the space available in the y-direction $H_j$ and corresponding vectors $\overline{y}_j$, can be determined by the number of image fields and how the image fields are arranged within the template. For example, for the template 300, shown in FIGS. 3A-3B, the template 300 is configured with a single image field resulting in a single constant $W_1$ and corresponding vector $\overline{x}_1$ and a single constant $H_1$ and corresponding vector $\overline{y}_1$. However, when the number of image fields exceeds one, the arrangement of image fields can create more that one row and/or column, and thus, the number of constants representing the space available in the x- and y-directions can be different, depending on how the image fields are arranged. For example, for the template 400, shown in FIG. 4A-4B, the image fields 402 and 404 create a single row in the x-direction so that the space available for adjusting the images placed in the image fields 402 and 404 in the x-direction can be accounted for with a single constant $W_1$ and the widths of the images and white space 410 can be accounted for in a single associated vector $\overline{x}_1$. On the other hand, as shown in FIG. 4A, the image fields 402 and 404 also create two different columns in the y-direction. Thus, the space available for separately adjusting the images placed in the image fields 402 and 404 in the y-direction can be accounted for with two different constants $H_1$ and $H_2$ and associated vectors $\overline{y}_1$ and $\overline{y}_2$. The template 500, shown in FIGS. 5A-5B, represents a case where the image fields 502 and 504 create two different rows in the x-direction and two different columns in the y-direction. Thus, in the x-direction, the space available for separately adjusting the images placed in the image fields 502 and 504 and the white spaces 512 and 514 can be accounted for with two different constants $W_1$ and $W_2$ and associated vectors $\overline{x}_1$ and $\overline{x}_2$, and in the y-direction, the space available for separately adjusting the same images and the white spaces 516 and 516 can be accounted for with two different constants $H_1$ and $H_2$ and associated vectors $\overline{y}_1$ and $\overline{y}_2$.

In summary, a template is defined for a given number of images. In particular, for a template configured with m rows and n columns of image fields, there are $W_1, W_2, \ldots, W_m$ constants and corresponding vectors $\overline{x}_1, \overline{x}_2, \ldots, \overline{x}_m$ associated with the m rows, and there are $H_1, H_2, \ldots, H_n$ constants and corresponding vectors $\overline{y}_1, \overline{y}_2, \ldots, \overline{y}_n$ associated with the n columns.

Probabilistic Methods for Optimizing Document Layouts

Figure 6:
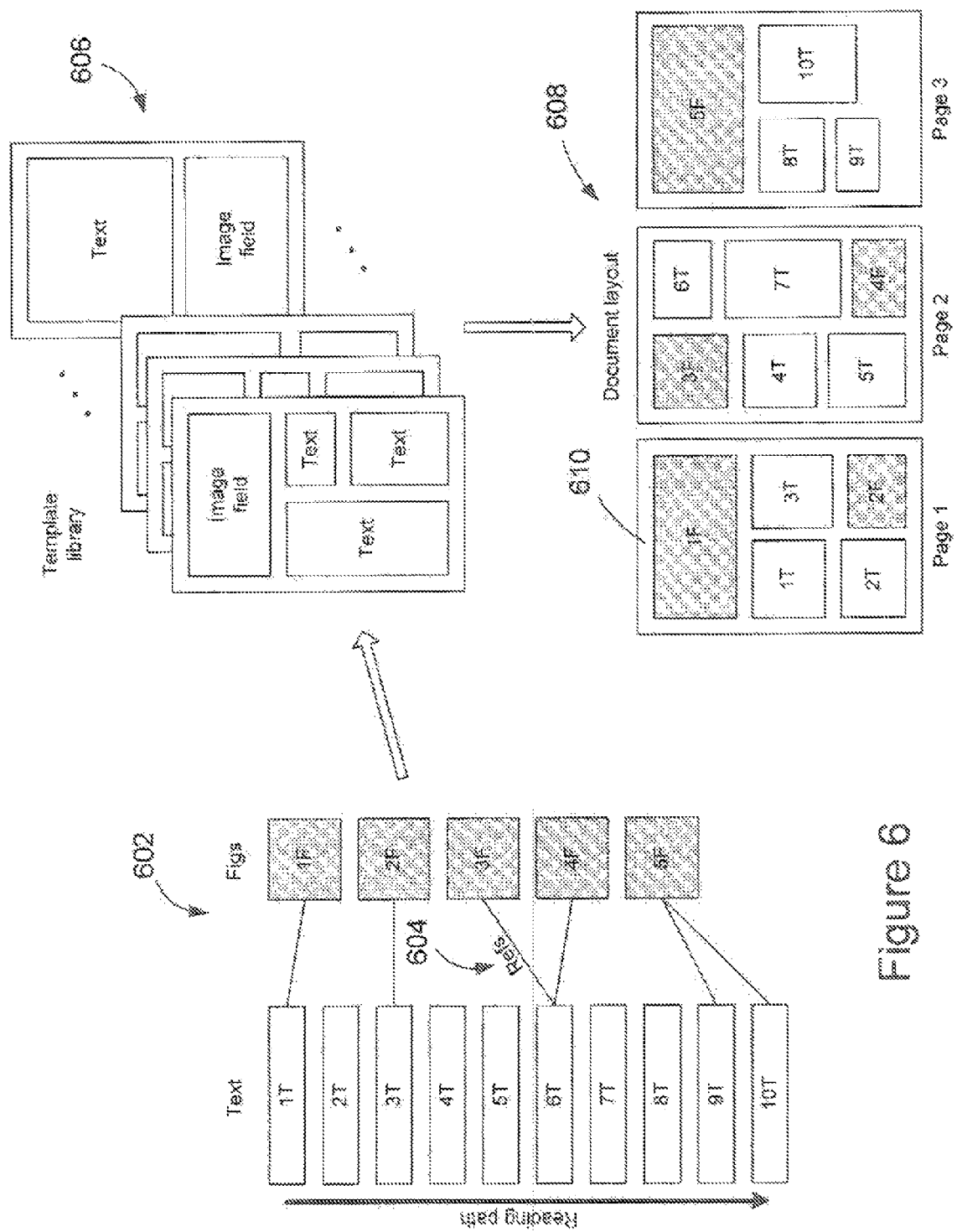
FIG. 6 shows an example of generating an optimized document layout from raw input in accordance with embodiments of the present invention.

FIG. 6 and the accompanying description are intended to introduce terminology and provide a general overview of the operations performed by method and system embodiments of the present invention.

Figure 1:
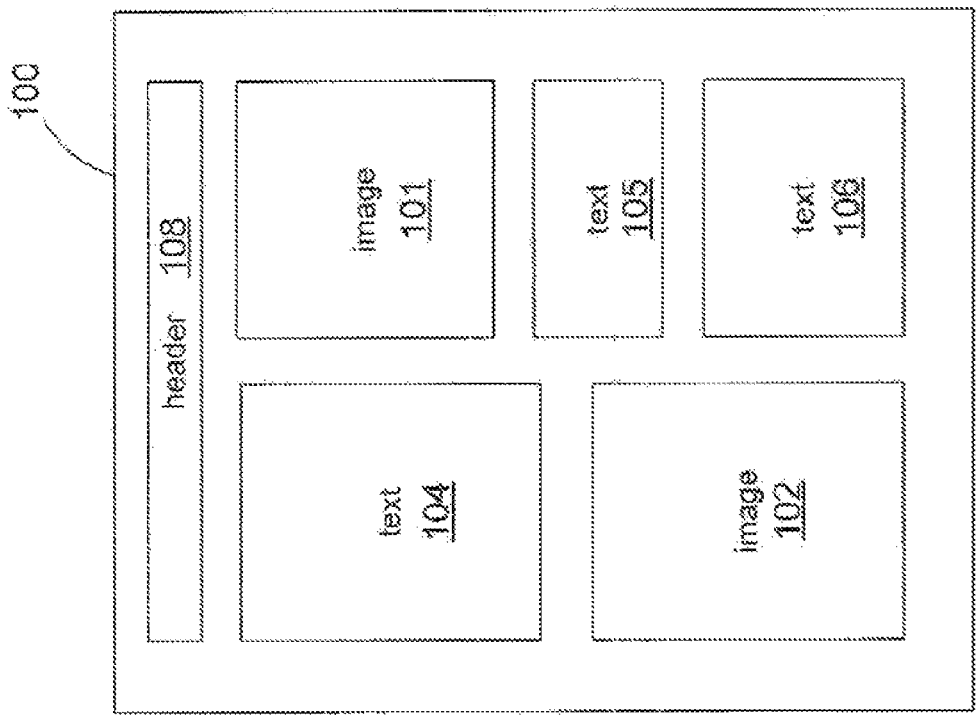
FIG. 1 shows an example of a template for a single page of a mixed-content document.

FIG. 6 shows an example of generating an optimized document layout from raw input in accordance with embodiments of the present invention. Raw input 602 comprises text, figures, references, and semantic information. The text portion of the raw input 602 is represented by rectangular blocks labeled 1T-10T, each block representing text such as one or more paragraphs or a heading, and the figures portion of the raw input 602 is represented by squares labeled 1F-5F, each square representing a figure. The raw input 602 also includes semantic information represented by lines extending between text blocks and figures. Semantic information can include which text blocks correspond to headings and which text blocks reference figures. For example, text block 1T makes reference to FIG. 1F and text blocks 9T and 10T make reference to FIG. 5F. Semantic information also identifies which text blocks and figures are associated with a reference. For example, reference 604 corresponds to text block 6T and FIG. 3F. Note the raw input does not include which text, figures, and references are to be selected for each page or how text, figures, and references are to be arranged on each page of the overall document.

Embodiments of the present invention determine an allocation of text, figures, and references for each page of the document. An allocation corresponds to the number of lines of text $n_L$ and the number of figures $n_F$ assigned to a page. Each page allocation is characterized by a random variable $A_j$, where j is a non-negative integer used to identify a page of the document. For the first page of the document j equals "0." A random variable is a function whose domain is a sample space and whose range is a set of real numbers. For example, referring to FIG. 6, an example of a sample space corresponding to the first page of the document can be the set:

$$S_0 = \{[1T;1F], [1T,2T;1F], [1T,2T,3T;1F,2F], [1T,2T,3T, 4T;1F,2F]\}$$

where each element in $S_0$ is a bracket listing text blocks and figures that can be allocated to the first page of the document. The random variable $A_0$ assigns a real value to each element in $S_0$. Allocations for pages 2 through P+1 are denoted by $A_1$ through $A_P$, respectively, and are similarly defined with an allocation for a subsequent page dependent upon the allocation for the previous page. Method and system embodiments described below determine optimal allocations $A_0^*, A_1^*, \ldots, A_P^*$ for each page. For example, the optimal allocation $A_0^*$ for page 1 can be the sample space element [1T,2T,3T; 1F,2F].

Returning to FIG. 6, once the optimal allocations are determined for the document, method and system embodiments determine an optimal template for each optimal allocation. FIG. 6 shows an example of a template library 606 stored in a computer readable medium. Suppose the optimal allocation $A_0^*$ for page 1 is [1T,2T,3T; 1F,2F]. There may be a number of templates in the template library 606 that can accommodate the text and figures associated with the optical allocation $A_0^*$. These templates form a sample space of a template random variable $T_0$ associated with the first page. Template random variables $T_1, \ldots, T_P$ associated with allocations for pages 2 through P+1 are similarly defined, with the sample space of each template random variable $T_j$ corresponding to a subset of templates in the template library 606. Method and system embodiments described below determine the optimal template for each of the optimal allocations.

Once an optimal template is determined for each page of the document, an optimal set of template parameters $\overline{\Theta}_j$, associated with dimensioning and spacing template elements is determined as described below, and each page of the document is rendered. For example, returning to FIG. 6 reveals an example of a final document layout 608 for the raw input 602, hypothetically generated by methods and system of the present invention. The document layout comprises three pages. Page 1 has the optimal allocation [1T,2T,3T; 1F,2F] and an optimal template selected from the template library 608 with optimal figure and white space parameters $\overline{\Theta}_0$. Subsequent pages 2 and 3 also correspond to optimal allocations, templates, and parameters.

Note that with the exception of the first page, allocations for subsequent pages depend on the allocation for the previous page. For example, consider once again the example allocation of text blocks and figures for the first page, [1T,2T, 3T; 1F,2F]. The allocation for the second page cannot also include text blocks 1T, 2T, 3T and FIGS. 1F and 2F, because these text blocks and figures have already been assigned to the first page.

Figure 7:
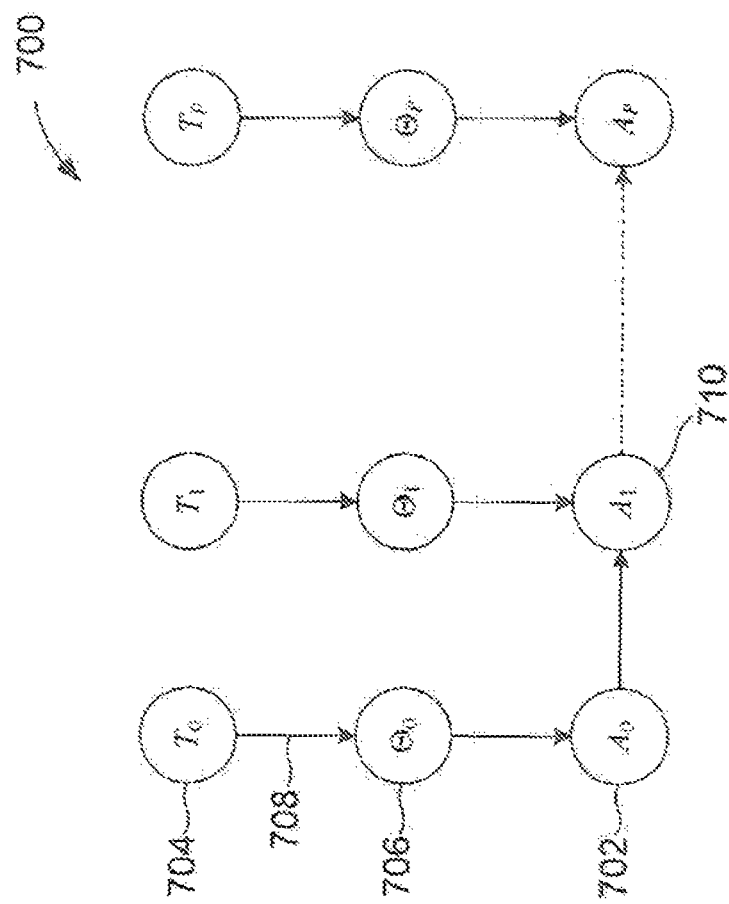
FIG. 7 shows a Bayesian network characterizing conditional independencies of allocations, templates, and template parameters in accordance with embodiments of the present invention.

The relationships between allocations, templates, and parameters can be represented by a Bayesian network. FIG. 7 shows a Bayesian network 700 characterizing conditional independencies of the random variables associated with allocations $A_j$, templates $T_j$, and parameters $\overline{\Theta}_j$ in accordance with embodiments of the present invention. Each node of the Bayesian network 700 represents a random variable corresponding to events in a sample space. For example, node 702 represents a random variable $A_0$ associated with a sample space of allocations for the first page, node 704 represents a random variable $T_0$ associated with a sample space of templates for the allocation selected for the first page, and node 706 represents the random variable vector $\overline{\Theta}_0$ associated with a sample space of parameters for the template selected for the first page. Directional arrows in the Bayesian network independently identify conditional probabilities between nodes. For example, directional arrow 708 represents the conditional probability $P(\overline{\Theta}_0|T_0)$ for a set of parameters $\overline{\Theta}_0$ given a template $T_0$, but the allocations $A_1, \ldots, A_P$ have more than one parent node. Thus, the conditional probability for the node 710 representing the allocation $A_1$ is $P(A_1|A_0, \overline{\Theta}_1)$.

Note that the Bayesian network defines an conditional independency structure. In other words, any node is conditionally independent of its non-descendent given its parent. For nodes like $T_0, \ldots, T_P$ the probabilities associated with these nodes $P(T_0), \ldots, P(T_P)$ are not conditioned on any other nodes.

A joint probability distribution that characterizes the conditional probabilities of a Bayesian network is a product of the probabilities of the parent nodes and the conditional probabilities. Thus, the joint probability distribution associated with the Bayesian network 700 is given by:

$$P(\{T_j\}, \{\overline{\Theta}_j\}, \{A_j\}) = P(A_0|\overline{\Theta}_0)P(\overline{\Theta}_0|T_0)P(T_0) \times \prod_{j=1}^{P} P(A_j|A_{j-1}, \overline{\Theta}_j)P(\overline{\Theta}_j|T_j)P(T_j)$$

As shown in FIG. 7, allocation $A_0$ for the first page "0" is independent, but allocations for each of the subsequent pages depend on the allocation for the previous page. Thus, $P(\{T_j\}, \{\overline{\Theta}_j\}, \{A_j\})$ includes the terms $P(A_j|A_{j-1}, \overline{\Theta}_j)$.

Method and system embodiments of the present invention are predicated on maximizing $P(\{T_j\},\{\overline{\Theta}_j\},\{A_j\})$ with the assumption that the larger the probability $P(\{T_j\},\{\overline{\Theta}_j\},\{A_j\})$, the closer the document layout is to having the following desired document properties:

(1) each page of the document should look as good as possible to achieve overall optimal layout quality;

(2) text blocks that reference figures and the corresponding figures should appear on the same page; and (3) the total number of pages is minimized.

In order to determine the sets $\{T_j\}$, $\{\overline{\Theta}_j\}$, and $\{A_j\}$ for a document that give the maximum probability $P(\{T_j\},\{\overline{\Theta}_j\},\{A_j\})$, a maximum joint probability distribution is defined as follows:

$$P^*(\{T_j\},\{\overline{\Theta}_j\},\{A_j\}) = \max_{\{A_j\}} \phi(A_0) \prod_{j=1}^{P} \phi(A_j, A_{j-1}) \quad \text{Equation (1)}$$

$$\phi(A_j, A_{j-1}) = \max_{T_j} \psi(A_j, A_{j-1}, T_j) P(T_j) \quad \text{Equation (2)}$$

$$\psi(A_j, A_{j-1}, T_j) = \max_{\overline{\Theta}_j} P(A_j | A_{j-1}, \overline{\Theta}_j) P(\overline{\Theta}_j | T_j) \quad \text{Equation (3)}$$

Equations (1), (2), and (3) are used to determined optimal allocations, templates, and template parameters using the method of "belief propagation" from Bayesian methods. For the sake of simplicity, a description of determining the set $\{A_j\}$ of optimal allocations using belief propagation is described first, followed by a description of determining an optimal template for each optimal allocation, and finally determining optimal template parameters for each template. However, in practice, optimal allocations, templates, and template parameters can also be determined simultaneously using belief propagation.

The set of allocations $\{A_j\}$ that maximize equation (1) can be obtained by first determining the $\phi$'s. Each $\phi$ is a function of random variables, and is the maximum of a sequence of real numbers, one for each template $T_j$, as described in equation (2). Hence for each $A_j$ and $A_{j-1}$ we have a maximizing template $t_j^*$. For the first page, $\phi(A_0)$ is the maximum of the range of real values associated with the allocation $A_0$. For subsequent pages, $\phi(A_j, A_{j-1})$ is the maximum of the range of real values associated with the allocations $A_j$ and $A_{j-1}$.

Once the $\phi$'s have been determined, a set of recursive equations denoted by $\tau$ are used to determined the optimal allocations $A_0^*, A_1^*, \ldots, A_P^*$. First, each $\tau$ is computed recursively as follows:

$$\tau_1(A_1) = \max_{A_0} \phi(A_0) \phi(A_1, A_0),$$

$$\tau_j(A_j) = \max_{A_{j-1}} \tau_{j-1}(A_{j-1}) \phi(A_j, A_{j-1}), \text{ and}$$

$$\tau_{P+1}(A_1) = \max_{A_P} \tau_P(A_P)$$

Next, after each of the j's have been recursively obtained, optimal allocations $A_0^*, A_1^*, \ldots, A_P^*$ can be obtained by solving the $\tau_j$'s in a reverse recursive manner as follows:

$$A_P^* = \operatorname*{argmax}_{A_P} \tau_P(A_P), \text{ and}$$

$$A_{j-1}^* = \operatorname*{argmax}_{A_{j-1}} \tau_{j-1}(A_{j-1}) \phi(A_j^*, A_{j-1})$$

Thus, optimal allocations $A_0^*, A_1^*, \ldots, A_P^*$ for maximizing the probability $P^*(\{T_j\},\{\overline{\Theta}_j\},\{A_j\})$ have been determined.

After the set of optimal allocations have been determined, for each optimal allocation, equations (2) and (3) can be used to determine an optimal $T_j$ and $\overline{\Theta}_j$. For each $A_j$ there is a set of $T_j$'s. Once a $\phi(A_j, A_{j-1})$ is determined, the corresponding $T_j$ maximizes equation (2) and the corresponding template parameters $\overline{\Theta}_j$ maximize equation (3). In equation (3), $P(A_j|A_{j-1},\overline{\Theta}_j)$ is the product of layout quality, reference quality, and page qualities probabilities given by:

$$P(A_j|A_{j-1},\overline{\Theta}_j) = P_Q(A_j|A_{j-1},\overline{\Theta}_j) P_R(A_j|A_{j-1}) P_P(A_j|A_{j-1})$$

The conditional probability $P_Q(A_j|A_{j-1},\overline{\Theta}_j)$ associated with layout quality is determined by a document designer. The reference quality probability can be defined as follows:

$$P_R(A_j|A_{j-1}) \propto \exp\{-\gamma |R_{A_j,A_{j-1}}|\}$$

where $\gamma$ is a reference constant assigned by the document designer, and $|R_{A_j,A_{j-1}}|$ corresponds to the number of misplaced references due to the previous allocation $A_{j-1}$. The page quantity probability can be defined as follows:

$$P_P(A_j|A_{j-1}) \propto \exp\{-\delta\}$$

where $\delta$ is a page constant assigned by the document designer and corresponds to a page number penalty that is used to control the overall number of pages in the final document.

Next, a closed form equation for determining the parameter vector $\overline{\Theta}_j$ for each template is now described. This closed form description can be obtained by considering the relationship between dimensions of elements of a template with m rows of image fields and n columns of image fields and the corresponding parameter vector $\overline{\Theta}$ in terms of Bayes' Theorem from probability theory as follows:

$$P(\overline{\Theta}|\overline{W},\overline{H},\overline{x},\overline{y}) \propto P(\overline{W},\overline{H},\overline{x},\overline{y}|\overline{\Theta}) P(\overline{\Theta}) \quad \text{Equation (4):}$$

where $$\overline{W} = [W_1, W_2, \ldots, W_m]^T,$$

$$\overline{H} = [H_1, H_2, \ldots, H_n]^T,$$

$$\overline{x} = [\overline{x}_1, \overline{x}_2, \ldots, \overline{x}_m]^T,$$

$$\overline{y} = [\overline{y}_1, \overline{y}_2, \ldots, \overline{y}_n]^T, \text{ and}$$

the exponent T represents the transpose from matrix theory.

Vector notation is used to succinctly represent template constants $W_i$ and corresponding vectors $\overline{x}_i$ associated with the m rows and template constants $H_j$ and corresponding vectors $\overline{y}_j$ associated with the n columns of the template.

Equation (4) is in the form of Bayes' Theorem but with the normalizing probability $P(\overline{W},\overline{H},\overline{x},\overline{y})$ excluded from the denominator of the right-hand side of equation (1) (e.g., see the definition of Bayes' Theorem provided in the subsection titled An Overview of Bayes' Theorem and Notation from Probability Theory). As demonstrated below, the normalizing probability $P(\overline{W},\overline{H},\overline{x},\overline{y})$ does not contribute to determining the template parameters $\overline{\Theta}$ that maximize the posterior probability $P(\overline{\Theta}|\overline{W},\overline{H},\overline{x},\overline{y})$, and for this reason $P(\overline{W},\overline{H},\overline{x},\overline{y})$ can be excluded from the denominator of the right-hand side of equation (1).

In equation (4), the term $P(\overline{\Theta})$ is the prior probability associated with the parameter vector $\overline{\Theta}$ and does not take into account the occurrence of an event composed of $\overline{W}, \overline{H}, \overline{x}$, and $\overline{y}$. In certain embodiments, the prior probability can be characterized by a normal, or Gaussian, probability distribution given by:

$$P(\Theta) \approx N(\Theta \mid \bar{\Theta}_1, \Lambda_1^{-1}) N(\Theta \mid \bar{\Theta}_2, \Lambda_2^{-1}) \propto$$
$$\exp\left((\bar{\Theta}_1 - \Theta)^T \frac{\Lambda_1}{2}(\bar{\Theta}_1 - \Theta)\right) \exp\left((\bar{\Theta}_2 - \Theta)^T \frac{\Lambda_2}{2}(\bar{\Theta}_2 - \Theta)\right)$$

where $\bar{\Theta}_1$ is a vector composed of independent mean values for the parameters set by a document designer;

$\Lambda_1$ is a diagonal matrix of variances for the independent parameters set by the document designer;

$\Lambda_2 = C^T \Delta^T \Delta C$ is a non-diagonal covariance matrix for dependent parameters; and $\bar{\Theta}_2 = \Lambda^{-1} C^T \Delta^T \Delta \bar{d}$ is a vector composed of dependent mean values for the parameters.

The matrix C and the vector $\bar{d}$ characterize the linear relationships between the parameters of the parameter vector $\bar{\Theta}$ given by $C\bar{\Theta} = \bar{d}$ and $\Delta$ is a covariance precision matrix. For example, consider the template 300 described above with reference to FIGS. 3A-3B. Suppose hypothetically the parameters of the parameter vector $\bar{\Theta}$ represented in FIG. 3B are linearly related by the following equations:

$0.2\theta_f + 3.1\theta_p \approx -1.4$, and $1.8\theta_f - 0.7\theta_{fp} + 1.1\theta_p \approx 3.1$ Thus, in matrix notation, these two equations can be represented as follows:

$$C\bar{\Theta} = \begin{bmatrix} 0.2 & 0 & 3.1 \\ 1.8 & -0.7 & 1.1 \end{bmatrix} \begin{bmatrix} \theta_f \\ \theta_{fp} \\ \theta_p \end{bmatrix} = \begin{bmatrix} -1.4 \\ 3.1 \end{bmatrix} = \bar{d}$$

Returning to equation (4), the term $P(\bar{W}, \bar{H}, \bar{x}, \bar{y} \mid \bar{\Theta})$ is the conditional probability of an event composed of $\bar{W}$, $\bar{H}$, $\bar{x}$, and $\bar{y}$ given the occurrence of the parameters of the parameter vector $\bar{\Theta}$. In certain embodiments, the term $P(\bar{W}, \bar{H}, \bar{x}, \bar{y} \mid \bar{\Theta})$ can be characterized as follows:

$$P(\bar{W}, \bar{H}, \bar{x}, \bar{y} \mid \Theta) \propto \prod_i \prod_j N(W_i \mid \Theta^T \bar{x}_i, \alpha_i^{-1}) N(H_j \mid \Theta^T \bar{y}_j, \beta_j^{-1})$$  Equation (2)

where $$N(W_i \mid \Theta^T \bar{x}_i, \alpha_i^{-1}) \propto \exp\left(-\frac{\alpha_i}{2}(\Theta^T \bar{x}_i - W_i)^2\right),\text{ and}$$

$$N(H_j \mid \Theta^T \bar{y}_j, \beta_j^{-1}) \propto \exp\left(-\frac{\beta_j}{2}(\Theta^T \bar{y}_j - H_j)^2\right).$$

are normal probability distributions. The variables $\alpha_i^{-1}$ and $\beta_j^{-1}$ are variances and $W_i$ and $H_j$ represent mean values for the distributions $N(W_i \mid \Theta^T \bar{x}_i, \alpha_i^{-1})$ and $N(H_j \mid \Theta^T \bar{y}_j, \beta_j^{-1})$, respectively. Normal distributions can be used to characterize, at least approximately, the probability distribution of a variable that tends to cluster around the mean. In other words, variables close to the mean are more likely to occur than are variables farther from the mean. The normal distributions $N(W_i \mid \Theta^T \bar{x}_i, \alpha_i^{-1})$ and $N(H_j \mid \Theta^T \bar{y}_j, \beta_j^{-1})$ characterize the probability distributions of the variables $W_i$ and $H_j$ about the mean values $\Theta^T \bar{x}_i$ and $\Theta^T \bar{y}_j$, respectively.

Figure 8:
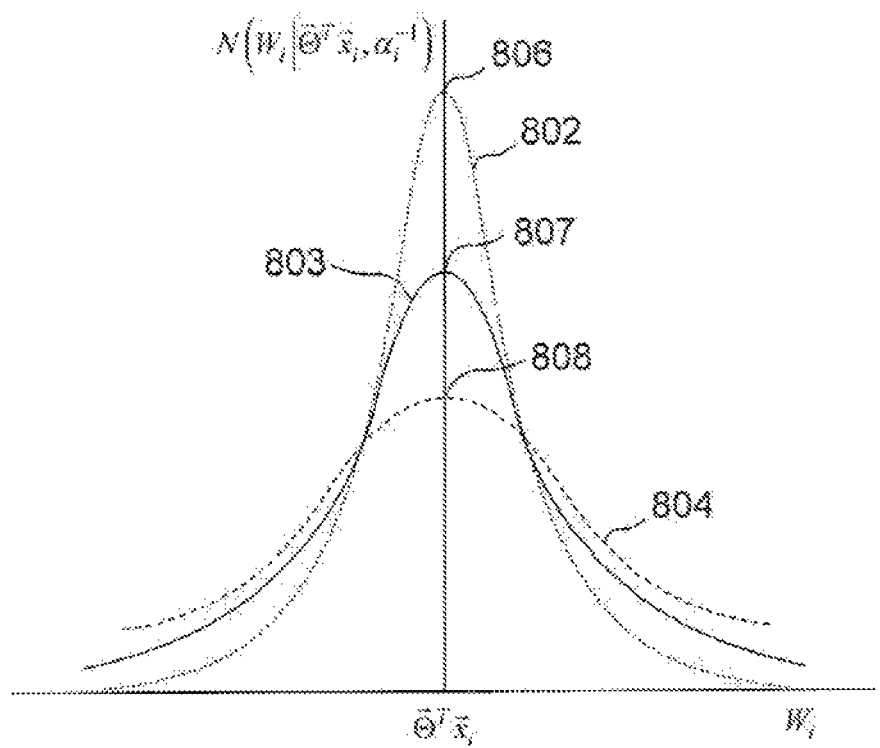
FIG. 8 shows an exemplary plot of a normal distribution for three different variances in accordance with embodiments of the present invention.

For the sake of discussion, consider just the distribution $N(W_i \mid \Theta^T \bar{x}_i, \alpha_i^{-1})$. FIG. 8 shows exemplary plots of $N(W_i \mid \Theta^T \bar{x}_i, \alpha_i^{-1})$ represented by curves 802-804, each curve representing the normal distribution $N(W_i \mid \Theta^T \bar{x}_i, \alpha_i^{-1})$ for three different values of the variance $\alpha_i^{-1}$. Comparing curves 802-804 reveals that curve 802 has the smallest variance and the narrowest distribution about $\Theta^T \bar{x}_i$, curve 804 has the largest variance and the broadest distribution about $\Theta^T \bar{x}_i$, and curve 803 has an intermediate variance and an intermediate distribution about $\Theta^T \bar{x}_i$. In other words, the larger the variance $\alpha_i^{-1}$ the broader the distribution $N(W_i \mid \Theta^T \bar{x}_i, \alpha_i^{-1})$ about $\Theta^T \bar{x}_i$, and the smaller the variance $\alpha_i^{-1}$ the narrower the distribution $N(W_i \mid \Theta^T \bar{x}_i, \alpha_i^{-1})$ about $\Theta^T \bar{x}_i$. Note that all three curves 802-804 also have corresponding maxima 806-808 centered about $\Theta^T \bar{x}_i$. Thus, when $\Theta^T \bar{x}_i$ equals $W_i$ (i.e, $\Theta^T \bar{x}_i - W_i = 0$), the normal distribution $N(W_i \mid \Theta^T \bar{x}_i, \alpha_i^{-1})$ is at a maximum value. The same observations can also be made for the normal distribution $N(H_j \mid \Theta^T \bar{y}_j, \beta_j^{-1})$.

The posterior probability $P(\Theta \mid \bar{W}, \bar{H}, \bar{x}, \bar{y})$ can be maximized when the exponents of the normal distributions of equation (2) satisfy the following conditions:

$\Theta^T \bar{x}_i - W_i \approx 0$ and $\Theta^T \bar{y}_j - H_j \approx 0$ for all i and j. As described above, for a template, $W_i$ and $H_j$ are constants and the elements of $\bar{x}_i$ and $\bar{y}_j$ are constants. These conditions are satisfied by determining a parameter vector $\bar{\Theta}^{MAP}$ that maximizes the posterior probability $P(\Theta \mid \bar{W}, \bar{H}, \bar{x}, \bar{y})$. The parameter vector $\bar{\Theta}^{MAP}$ can be determined by rewriting the posterior probability $P(\Theta \mid \bar{W}, \bar{H}, \bar{x}, \bar{y})$ as a multi-variate normal distribution with a well-characterized mean and variance as follows:

$$P(\Theta \mid \bar{W}, \bar{H}, \bar{x}, \bar{y}) = N\left(\Theta \mid \bar{\Theta}^{MAP}, \left(\Lambda + \sum_i \alpha_i \bar{x}_i \bar{x}_i^T + \sum_j \beta_j \bar{y}_j \bar{y}_j^T\right)^{-1}\right)$$

The parameter vector $\bar{\Theta}^{MAP}$ is the mean of the normal distribution characterization of the posterior probability $P(\Theta \mid \bar{W}, \bar{H}, \bar{x}, \bar{y})$, and $\Theta$ maximizes $P(\Theta \mid \bar{W}, \bar{H}, \bar{x}, \bar{y})$ when $\Theta$ equals $\bar{\Theta}^{MAP}$. Solving $P(\Theta \mid \bar{W}, \bar{H}, \bar{x}, \bar{y})$ for $\bar{\Theta}^{MAP}$ gives the following closed form expression:

$$\bar{\Theta}^{MAP} = \left(\Lambda + \sum_i \alpha_i \bar{x}_i \bar{x}_i^T + \sum_j \beta_j \bar{y}_j \bar{y}_j^T\right)^{-1} \left(\Lambda\bar{\Theta} + \sum_i \alpha_i W_i \bar{x}_i + \sum_j \beta_j H_j \bar{y}_j\right)$$

The parameter vector $\bar{\Theta}^{MAP}$ can also be rewritten in matrix from as follows:

$$\bar{\Theta}^{MAP} = A^{-1} \bar{b}$$

where $$A = \Lambda + \sum_i \alpha_i \bar{x}_i \bar{x}_i^T + \sum_j \beta_j \bar{y}_j \bar{y}_j^T$$

is a matrix and $A^{-1}$ is the inverse of A, and $$\bar{b} = \Lambda\bar{\Theta} + \sum_i \alpha_i W_i \bar{x}_i + \sum_j \beta_j H_j \bar{y}_j$$

is a vector.

In summary, given a single page template and figures to be placed in the image fields of the template, the parameters used to scale the images and white spaces of the template can be determined from the closed form equation for $\overline{\Theta}^{MAP}$.

Once the parameters of the parameter vector $\overline{\Theta}^{MAP}$ are determined using the closed form equation for $\overline{\Theta}^{MAP}$, the template can be rendered by multiplying un-scaled dimensions of the images and widths of the white spaces by corresponding parameters of the parameter vector $\overline{\Theta}^{MAP}$.

The elements of the parameter vector $\overline{\Theta}^{MAP}$ may also be subject to boundary conditions on the image fields and white space dimensions arising from the minimum width constraints for the margins. In other embodiments, in order to determine $\overline{\Theta}^{MAP}$ subject to boundary conditions, the vectors $\overline{x}_1, \overline{x}_2, \overline{y}_1,$ and $\overline{y}_2$, the variances $\alpha_1^{-1}, \alpha_2^{-1}$, and $\beta_1^{-1}$, and $\beta_2^{-1}$, the constants $W_1, W_2, H_1,$ and $H_2$ are inserted into the linear equation $A\overline{\Theta}^{MAP} = \overline{b}$, and the matrix equation solved numerically for the parameter vector $\overline{\Theta}^{MAP}$ subject to the boundary conditions on the parameters of $\overline{\Theta}^{MAP}$. The matrix equation $A\overline{\Theta}^{MAP} = \overline{b}$ can be solved using any well-known numerical method for solving matrix equations subject to boundary conditions on the vector $\overline{\Theta}^{MAP}$, such as the conjugate gradient method.

Implementation

Figure 9:
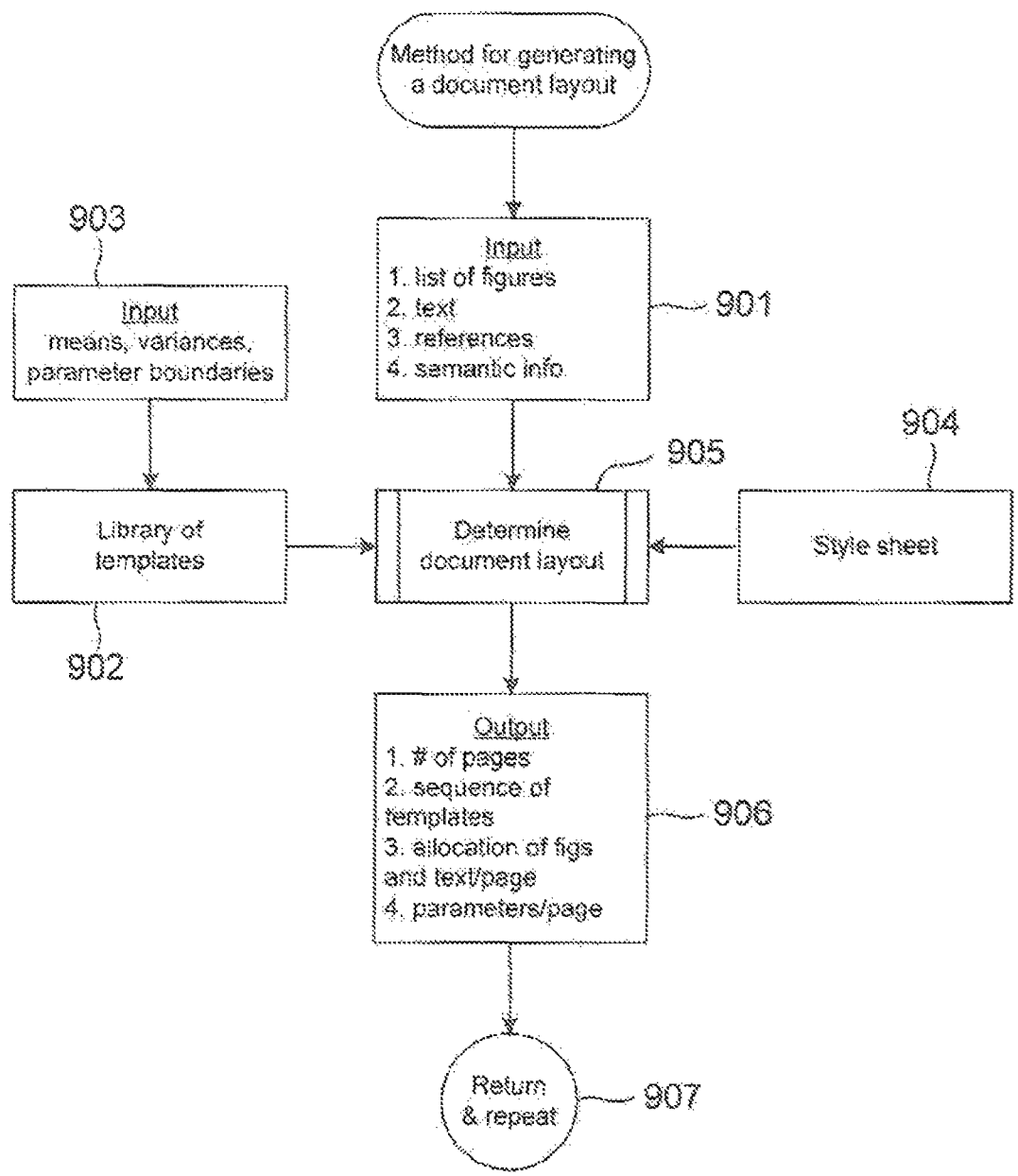
FIG. 9 shows a control-flow diagram of a method for generating a document layout in accordance with embodiments of the present invention.
Figure 10:
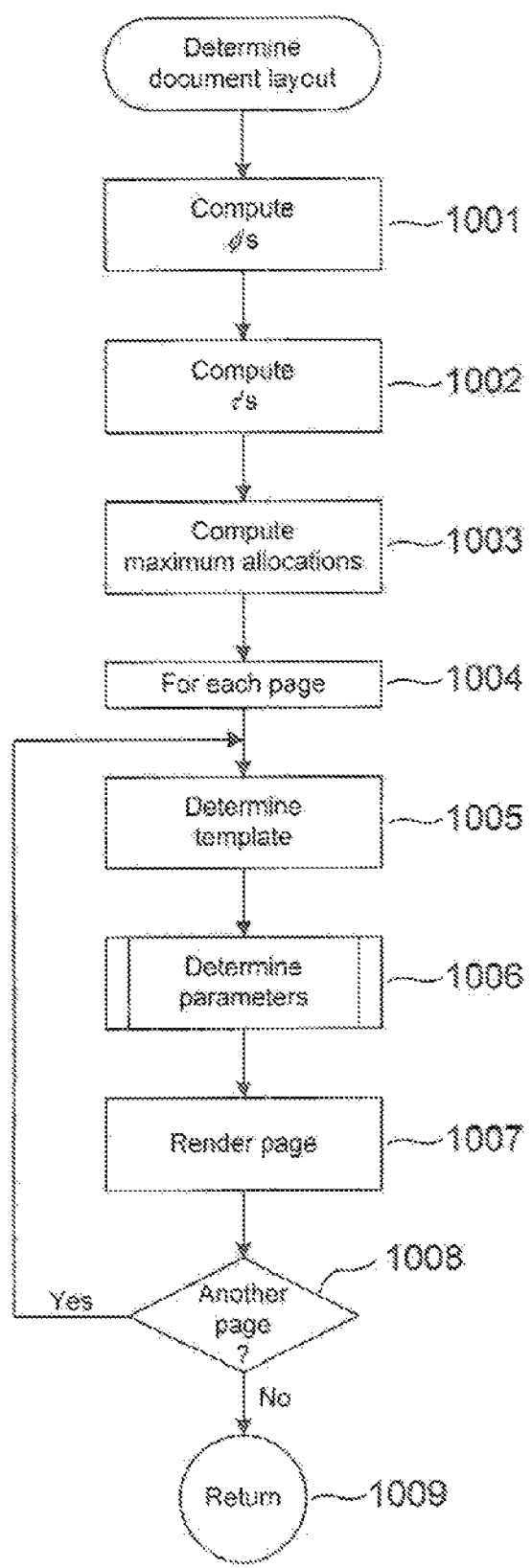
FIG. 10 shows a control-flow diagram of a method for executing a step in the control-flow diagram of FIG. 9 in accordance with embodiments of the present invention.
Figure 11:
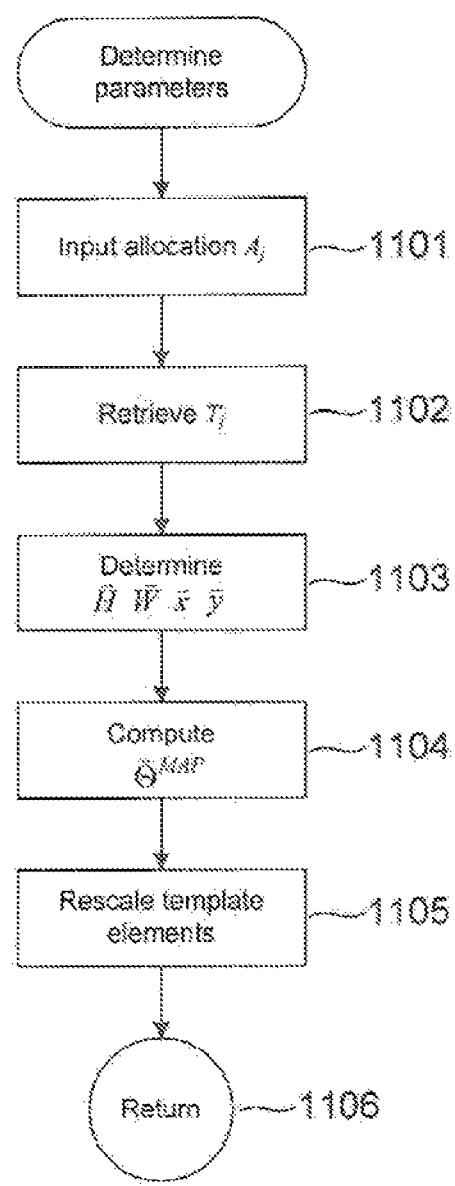
FIG. 11 shows a control-flow diagram of a method executing a step in the control-flow diagram of FIG. 10 in accordance with embodiments of the present invention.

FIGS. 9-11 show control-flow diagrams summarizing computational steps of just one method using belief propagation in an automated process of generating a document layout. Embodiments of the present invention are not limited to the specific order in which the following steps are presented. In other embodiments, the order in which the steps are performed can be changed without deviating from the scope of embodiments of the present invention described herein.

FIG. 9 shows a control-flow diagram of a method for generating a document layout in accordance with embodiments of the present invention. In step 901, a raw list of figures, text, references, and semantic information is input, as described above with reference to FIG. 6. The raw input of step 901 does not include instructions regarding which text, figures, and references are to be selected for each page or even how text, figures, and references are to be arranged on each page. In step 902, a library of templates is input, as described above with reference to FIG. 6. In step 903, mean values corresponding to the widths $W_1$ and $H_1$, the variances $\alpha_i^{-1}$ and $\beta_j^{-1}$, and bounds for the parameters of the parameter vector $\overline{\Theta}$ can also be input with the library of template. In step 904, a style sheet corresponding to the document's overall appearance is input. The style sheet may include (1) a typeface, character size, and colors for headings, text, and background; (2) format for how front matter, such as preface, figure list, and title page should appear; (3) format for how sections can be arranged in terms of space and number of columns, line spacing, margin widths on all sides, and spacing between headings just to name a few; and (4) any boilerplate content included on certain pages, such as copyright statements. The style sheet typically applies to the entire document. As necessary, specific elements of the style sheet may be overridden for particular sections of the document. In step 905, a subroutine called "determine document layout" is called. The subroutine uses an automated method for determining an optimized document layout described below with reference to FIG. 9. In step 906, a document with an optimized layout is output. The document layout includes an optimized allocation of text and images per page, optimized templates for each page, and optimized scaling of images and other design elements including whitespaces. In step 907, steps 901-906 can be repeated for a different document.

FIG. 10 shows a control-flow diagram of a method corresponding to the subroutine "determine document layout" called in step 905 of FIG. 9 in accordance with embodiments of the present invention. In step 1001, the φ's associated with equation (1) are computed. The φ's can be determined as described using a local conditional page model that is the product of layout quality, reference quality, and page qualities probabilities whose parameters are set by the document designer. In step 1002, a set of τ's are determined recursively as described above. In step 1003, optimal allocations $A_0^*, A_1^*, \ldots, A_P^*$, that contribute to $P^*(\{T_j\},\{\overline{\Theta}_j\},\{A_j\})$ are determined using reverse recursion, as described above. Step 1004 if a for-loop that repeats steps 1005-1007 for each page of the document. In step 1005, a template is determined using equation (2). In step 1006, a subroutine "determine parameters" is called. This subroutine produces a set of optimized template parameters for each template determined in step 1005. In step 1007, a page is rendered with the optimized template and corresponding template parameters. The template page can be rendered by exhibiting the page on monitor, television set, or any other suitable display, or the template page can be rendered by printing the page on a sheet of paper. In step 1008, when the document includes another page, steps 1005-1007 are repeated, otherwise the subroutine returns to "determine document layout" in FIG. 9.

FIG. 11 shows a control-flow diagram of a method corresponding to the subroutine "determine parameters" called in step 1006 of FIG. 10 in accordance with embodiments of the present invention. In step 1101, streams of text and figures data associated with an allocation are input. In step 1102, a template corresponding to the page determined in step 1005 of FIG. 10 is retrieved. In step 1103, elements of the vectors $\overline{W}, \overline{H}, \overline{x},$ and $\overline{y}$ are determined as described in the subsection Template Parameters. Mean values mean values $\overline{\Theta}^T \overline{x}_i$ and $\overline{\Theta}^T \overline{y}_j$, variances $\alpha_i^{-1}$ and $\beta_j^{-1}$, and bounds for the parameters of the parameter vector $\overline{\Theta}$ input in step 903 of FIG. 9 are retrieved for computation in the following step. In step 1104, the parameter vector $\overline{\Theta}^{MAP}$ that maximizes the posterior probability $P(\overline{\Theta}|\overline{W},\overline{H},\overline{x},\overline{y})$ is determined as described above. Elements of the parameter vector $\overline{\Theta}^{MAP}$ can be determined by solving the matrix equation $A\overline{\Theta}^{MAP} = \overline{b}$ for $\overline{\Theta}^{MAP}$ using the conjugate gradient method or any other well-known matrix equation solver where the elements of the vector $\overline{\Theta}^{MAP}$ are subject to boundary conditions, such as minimum constraints placed on the margins. In step 1105, once the parameter vector $\overline{\Theta}^{MAP}$ is determined, rescaled dimensions of the figures and widths of the white spaces can be obtained by multiplying dimensions of the template elements by the corresponding parameters of the parameter vector $\overline{\Theta}^{MAP}$. In step 1106, the subroutine returns to the subroutine "determine document layout" of FIG. 10.

In general, the automated methods of the present invention for generating a document layout described above can be implemented on a computing device, such as a desktop computer, a laptop, or any other suitable device configured to carrying out the processing steps of a computer program. FIG. 12 shows a schematic representation of a computing device 1200 configured in accordance with embodiments of the present invention. The device 1200 may include one or more processors 1202, such as a central processing unit; one or more display devices 1204, such as a monitor; a printer 1206 for printing a document; one or more network interfaces 1208, such as a Local Area Network LAN, a wireless 802.11x LAN, a 3G mobile WAN or a WiMax WAN; and one or more computer-readable mediums 1210. Each of these components is operatively coupled to one or more buses 1212. For example, the bus 1212 can be an EISA, a PCI, a USB, a FireWire, a NuBus, or a PDS.

The computer readable medium 1210 can be any suitable medium that participates in providing instructions to the processor 1202 for execution. For example, the computer readable medium 1210 can be non-volatile media, such as firmware, an optical disk, a magnetic disk, or a magnetic disk drive; volatile media, such as memory; and transmission media, such as coaxial cables, copper wire, and fiber optics. The computer readable medium 1210 can also store other software applications, including word processors, browsers, email, Instant Messaging, media players, and telephony software.

The computer-readable medium 1210 may also store an operating system 1214, such as Mac OS, MS Windows, Unix, or Linux; network applications 1216; and a document layout application 1218 that performs the methods of the present invention. The operating system 1214 can be multi-user, multiprocessing, multitasking, multithreading, real-time and the like. The operating system 1214 can also perform basic tasks such as recognizing input from input devices, such as a keyboard, a keypad, or a mouse; sending output to the display 1204 and the printer 1206; keeping track of files and directories on medium 1210; controlling peripheral devices, such as disk drives, printers, image capture device; and managing traffic on the one or more buses 1212. The network applications 1216 includes various components for establishing and maintaining network connections, such as software for implementing communication protocols including TCP/IP, HTTP, Ethernet, USB, and FireWire.

A document layout application 1218 provides various software components for automatically generating a document layout, as described above. In certain embodiments, some or all of the processes performed by the application 1218 can be integrated into the operating system 1214. In certain embodiments, the processes can be at least partially implemented in digital electronic circuitry, or in computer hardware, firmware, software, or in any combination thereof.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for generating a document layout using a computing device, the method comprising:
   receiving raw text, figures, references, and semantic information as input, wherein the semantic information further comprises information regarding which blocks of text correspond to particular figures, and which blocks of text correspond to particular references and does not include instructions for allocating or arranging text, figures, and references to pages of the document;
   for each page of the document:
      determining an allocation of text, figures, and references based at least on the received semantic information;
      determining a template for displaying the allocation assigned to the page; and
      scaling template fields to exhibit the text, figured, and references assigned to the page, wherein scaling the template fields comprises computing a template parameter vector that maximizes a probabilistic characterization of the one or more figures and white space dimensions of a template,
      wherein the allocation, template, and template parameter vector maximize a joint probability distribution associated with the conditional probabilities of a Bayesian network characterization of the independency structure of the allocation, template, and template parameter vector; and
   rendering the document with text, figures, and references allocated to each page within appropriate scaled template fields of the template selected for each page.

2. The method of claim 1 wherein determining the allocation further comprises determining layout quality, reference quality, and page quantity probability distributions.

3. The method of claim 1 wherein determining the allocation further comprises limiting misplaced allocation of references to pages that are different from pages containing text and figures associated with the references.

4. The method of claim 1 wherein determining the all further comprises constraining overall number of pages in the document.

5. The method of claim 1 wherein determining the allocation of text, figures, and references for each further comprises assigning the text blocks that reference figures to appear on the same page.

6. A computer-readable non-transitory medium having instructions encoded therein for enabling a processor of a computing device to perform the operations of:
   receiving raw text, figures, references, and semantic information as input, wherein the semantic information further comprises information regarding which blocks of text correspond to particular figures, and which blocks of text correspond to particular references and does not include instructions for allocating or arranging text, figures, and references to pages of the document;
   for each page of the document:
      determining an allocation of text, figures, and references based at least on the received semantic information;
      determining a template for displaying the allocation assigned to the page; and
      scaling template fields to exhibit the text, figured, and references assigned to the page, wherein scaling the template fields comprises computing a template parameter vector that maximizes a probabilistic characterization of the one or more figures and white space dimensions of a template,
      wherein the allocation, template, and template parameter vector maximize a joint probability distribution associated with the conditional probabilities of a Bayesian network characterization of the independency structure of the allocation, template, and template parameter vector; and
   rendering the document with text, figures, and references allocated to each page within appropriate scaled template fields of the template selected for each page.

7. The computer-readable not transitory medium of claim 6 wherein determining the allocation further comprises limiting misplaced allocation of references to pages that are different from pages containing text and figures associated with the references.

8. The computer-readable non-transitory medium of claim 6 wherein determining the allocation further comprises constraining overall number of pages in the document.

9. The computer-readable non-transitory medium of claim 6 wherein determining the allocation of text, figures, and references for each further comprises assigning the text blocks that reference figures to appear on the same page.

* * * * *

UNITED STATES PATENT AND TRADEMARK OFFICE
CERTIFICATE OF CORRECTION

PATENT NO. : 8,468,448 B2  
APPLICATION NO. : 13/501266  
DATED : June 18, 2013  
INVENTOR(S) : Niranjan Damera-Venkata Page 1 of 1

It is certified that error appears in the above-identified patent and that said Letters Patent is hereby corrected as shown below:

In the Claims:

In column 20, line 29, in Claim 4, delete "all" and insert -- allocation --, therefor.

In column 20, line 66, in Claim 7, delete "not transitory" and insert -- non-transitory --, therefor.

Signed and Sealed this  
Tenth Day of September, 2013

Teresa Stanek Rea  
*Acting Director of the United States Patent and Trademark Office*